US012573574B1

(12) United States Patent
Yoneda

(10) Patent No.: US 12,573,574 B1
(45) Date of Patent: Mar. 10, 2026

(54) PROTECTIVE ELEMENT

(71) Applicant: DEXERIALS CORPORATION, Shimotsuke (JP)

(72) Inventor: Yoshihiro Yoneda, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 250 days.

(21) Appl. No.: 18/276,318

(22) PCT Filed: Feb. 15, 2022

(86) PCT No.: PCT/JP2022/005923
§ 371 (c)(1),
(2) Date: Aug. 8, 2023

(87) PCT Pub. No.: WO2022/176843
PCT Pub. Date: Aug. 25, 2022

(30) Foreign Application Priority Data

Feb. 19, 2021 (JP) ................................ 2021-025652

(51) Int. Cl.
*H01H 85/175* (2006.01)
*H01H 85/00* (2006.01)
(Continued)

(52) U.S. Cl.
CPC ........ *H01H 85/0082* (2013.01); *H01H 85/06* (2013.01); *H01H 85/08* (2013.01); *H01H 85/17* (2013.01); *H01H 85/175* (2013.01)

(58) Field of Classification Search
CPC ..... H01H 85/0082–0086; H01H 85/43; H01H 85/06; H01H 85/08; H01H 85/165–1755
See application file for complete search history.

(56) References Cited

U.S. PATENT DOCUMENTS 2,734,110 A * 2/1956 Jacobs, Jr. ............. H01H 85/38
337/281
5,296,832 A * 3/1994 Perreault .............. H01H 85/153
337/201
(Continued)

FOREIGN PATENT DOCUMENTS

JP 2004119105 A 4/2004
JP 2011238489 A 11/2011
(Continued)

OTHER PUBLICATIONS

Office Action issued Jun. 4, 2024 in corresponding Japanese Patent Application No. 2021-025652 (with English translation), 11 pages.
(Continued)

*Primary Examiner* — Jacob R Crum
(74) *Attorney, Agent, or Firm* — Element IP, PLC

(57) ABSTRACT

A protective element includes: a fuse element configured to be energized in a first direction, which is a direction from a first end portion of the fuse element to a second end portion of the fuse element; a first terminal electrically connected to the first end portion; a second terminal electrically connected to the second end portion; a case made of an insulating material, having therein a housing portion storing the fuse element, and exposing a portion of the first terminal and a portion of the second terminal to an outside of the case; and a cover made of an insulating material having a tube shape, covering a lateral face along the first direction of the case, and exposing a portion of the first terminal from a first end of the cover, and exposes a portion of the second terminal from a second end of the cover.

10 Claims, 12 Drawing Sheets

(51) Int. Cl.

| | |
|---|---|
| ***H01H 85/06*** | (2006.01) |
| ***H01H 85/08*** | (2006.01) |
| ***H01H 85/17*** | (2006.01) |

(56) References Cited

U.S. PATENT DOCUMENTS

| | | | |
|---|---|---|---|
| 5,736,918 A | 4/1998 | Douglass | |
| 2003/0055160 A1* | 3/2003 | Yamazaki | C08L 77/02 524/606 |
| 2010/0102920 A1* | 4/2010 | Stanek | H01H 85/0013 337/186 |
| 2015/0371803 A1 | 12/2015 | Hosomizo et al. | |
| 2016/0141140 A1* | 5/2016 | Schmidt | H01H 85/143 337/187 |
| 2016/0240342 A1* | 8/2016 | Yoneda | H01H 85/08 |
| 2018/0138004 A1* | 5/2018 | Schlaak | H01H 85/0082 |
| 2018/0174791 A1 | 6/2018 | Kawai et al. | |
| 2021/0074502 A1 | 3/2021 | Yoneda | |

FOREIGN PATENT DOCUMENTS

| | | |
|---|---|---|
| JP | 2014154234 A | 8/2014 |
| JP | 2017004699 A | 1/2017 |
| JP | 2019121550 A | 7/2019 |

OTHER PUBLICATIONS

International Search Report issued May 10, 2022 in PCT/JP2022/005923 (with English translation), 4 pages.

International Preliminary Report on Patentability issued Apr. 3, 2023 in PCT/JP2022/005923 (with English translation), 12 pages.

Written Opinion of the International Searching Authority issued May 10, 2022 in PCT/JP2022/005923 (with English translation), 9 pages.

Office Action issued Sep. 26, 2024 in Korean Patent Application No. 10-2023-7016018 (with English translation), 9 pages.

Combined Taiwanese Office Action and Search Report issued Sep. 10, 2025 in Patent Application No. 111106021 (with English translation), 12 pages.

* cited by examiner

PROTECTIVE ELEMENT

TECHNICAL FIELD

The present invention relates to a protective element.

The present application claims priority on the basis of JP 2021-025652 filed in Japan on Feb. 19, 2021, the contents of which are herein incorporated by reference in their entirety.

BACKGROUND TECHNOLOGY

Conventionally, there are fuse elements that, when a current exceeding a rating flows in a current path, are heated, fuse, and cut off the current path. Protective elements (fuse devices) provided with a fuse element are used in a wide variety of fields—for example, electric vehicles.

For example, Patent Document 1 teaches a fuse, provided with: a fuse element that fuses when energized in excess of a rated current; and a case that houses therein a melting portion of the fuse element. Patent Document 1 also teaches that the case is a pair of split tubes joined together and that an outer periphery of the pair of split tubes is fastened by a ring.

CITATION LIST

Patent Documents

Patent Document 1: JP 2011-238489 A

SUMMARY OF INVENTION

Problem to be Solved by Invention

In a protective element, when a fuse element fuses, an arc is discharged, and pressure increases in a case storing the fuse element. This requires the strength of the case to be able to withstand the pressure increase accompanying the fusing of the fuse element. In particular, in a protective element disposed in a high-voltage and large-current current path, the large amount of energy of the arc discharged when the fuse element fuses greatly increases the pressure in the case. This requires further improving the case strength to more effectively prevent destruction of the protective element when the fuse element fuses.

The present invention is made in view of the above and has as an object to provide a protective element that is less likely to be destroyed when a fuse element fuses and that provides excellent safety.

Means to Solve the Problem

This invention proposes the following means to solve the above problem.

[1] A protective element, having: a fuse element energized in a first direction, from a first end portion to a second end portion; a first terminal electrically connected to the first end portion; a second terminal electrically connected to the second end portion; a case that is made of an insulating material, has provided therein a housing portion storing the fuse element, and exposes a portion of the first terminal and the second terminal to the outside; and a cover that is made of an insulating material having a tube shape, covers a lateral face along the first direction of the case, exposes a portion of the first terminal from a first end, and exposes a portion of the second terminal from a second end.

[2] The protective element of [1], wherein the case is made of a first case and a second case disposed opposing the first case with respect to the fuse element, and the first case and the second case interpose a portion of the first terminal and the second terminal and are fixed by the cover.

[3] The protective element of [1] or [2], further having: an internal-pressure buffer space surrounded by an outer face of the case and an inner face of the cover; wherein the case has a vent hole that penetrates the case and communicates the housing portion and the internal-pressure buffer space, and the outer face of the case and the inner face of the cover seal a space region that is the housing portion and the internal-pressure buffer space.

[4] The protective element of any among [1] to [3], wherein one or both among the case and the cover are made of any one resin material selected from among a nylon resin, a fluororesin, and a polyphthalamide resin.

[5] The protective element of [4], wherein the resin material is formed of a resin material whose tracking resistance index CTI is 600 V or higher.

[6] The protective element of [4], wherein the nylon resin is a resin containing no benzene ring.

[7] The protective element of any among [1] to [6], wherein the fuse element is a stacked body in which an inner layer that is a low-melting-point metal and an outer layer that is a high-melting-point metal are stacked in a thickness direction.

[8] The protective element of [7], wherein the low-melting-point metal is Sn or a metal whose main component is Sn, and the high-melting-point metal is Ag or Cu or a metal whose main component is Ag or Cu.

Effect of the Invention

The protective element of the present invention has the case that is made of the insulating material, exposes portions of the first terminal and the second terminal electrically connected to the fuse element energized in the first direction, and stores the fuse element. It also has the cover that is made of the insulating material having the tube shape, covers the lateral face along the first direction of the case, exposes a portion of the first terminal from the first end, and exposes a portion of the second terminal from the second end. In the protective element of the present invention, stress due to a pressure increase in the case when the fuse element fuses is loaded onto the case and the cover covering the lateral face along the first direction of the case. Thus, excellent strength is obtained against the pressure increase in the case. Therefore, the protective element of the present invention is less likely to be destroyed when the fuse element fuses, and excellent safety is provided.

DESCRIPTION OF THE EMBODIMENTS

Figure 1:
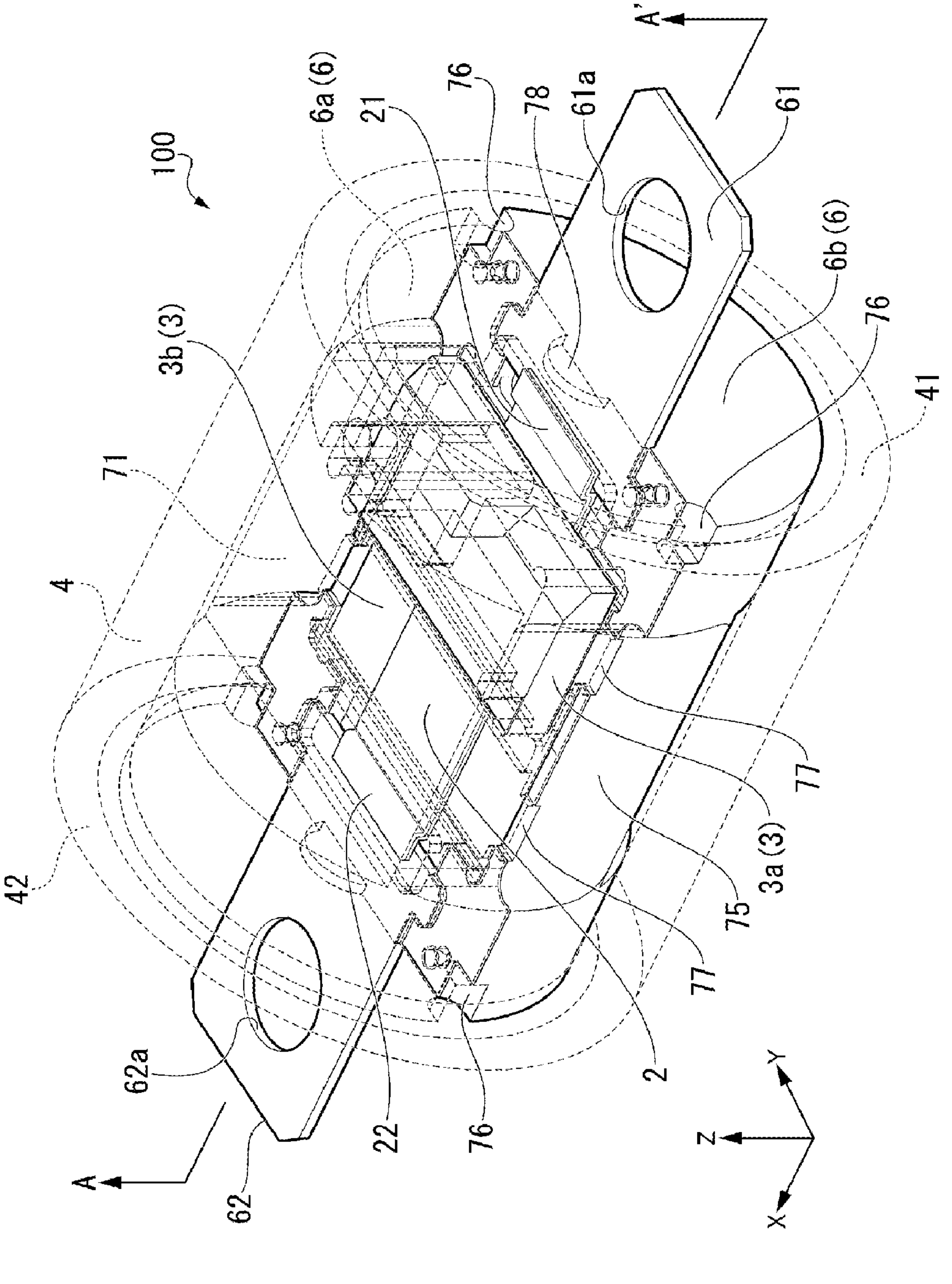
FIG. 1 is a perspective view illustrating the overall structure of a protective element 100 of a first embodiment.

The present embodiment is described in detail below while referencing the drawings as appropriate. For convenience, the drawings used in the following description may illustrate characteristic portions in an enlarged manner in order to facilitate understanding of the features; component dimensional ratios and the like may actually differ. The materials, dimensions, and the like illustrated in the following description are examples. The present invention is not limited thereto and can be modified as appropriate within a scope of exhibiting the effect of the invention.

(Protective Element)

FIG. 1 to FIG. 11 are schematic views illustrating a protective element of a first embodiment. In the drawings used in the following description, the direction indicated by X is a fuse-element energization direction (first direction). The direction indicated by Y is a direction orthogonal to the X direction (first direction), and the direction indicated by Z is a direction orthogonal to the X direction and the Y direction.

Figure 2:
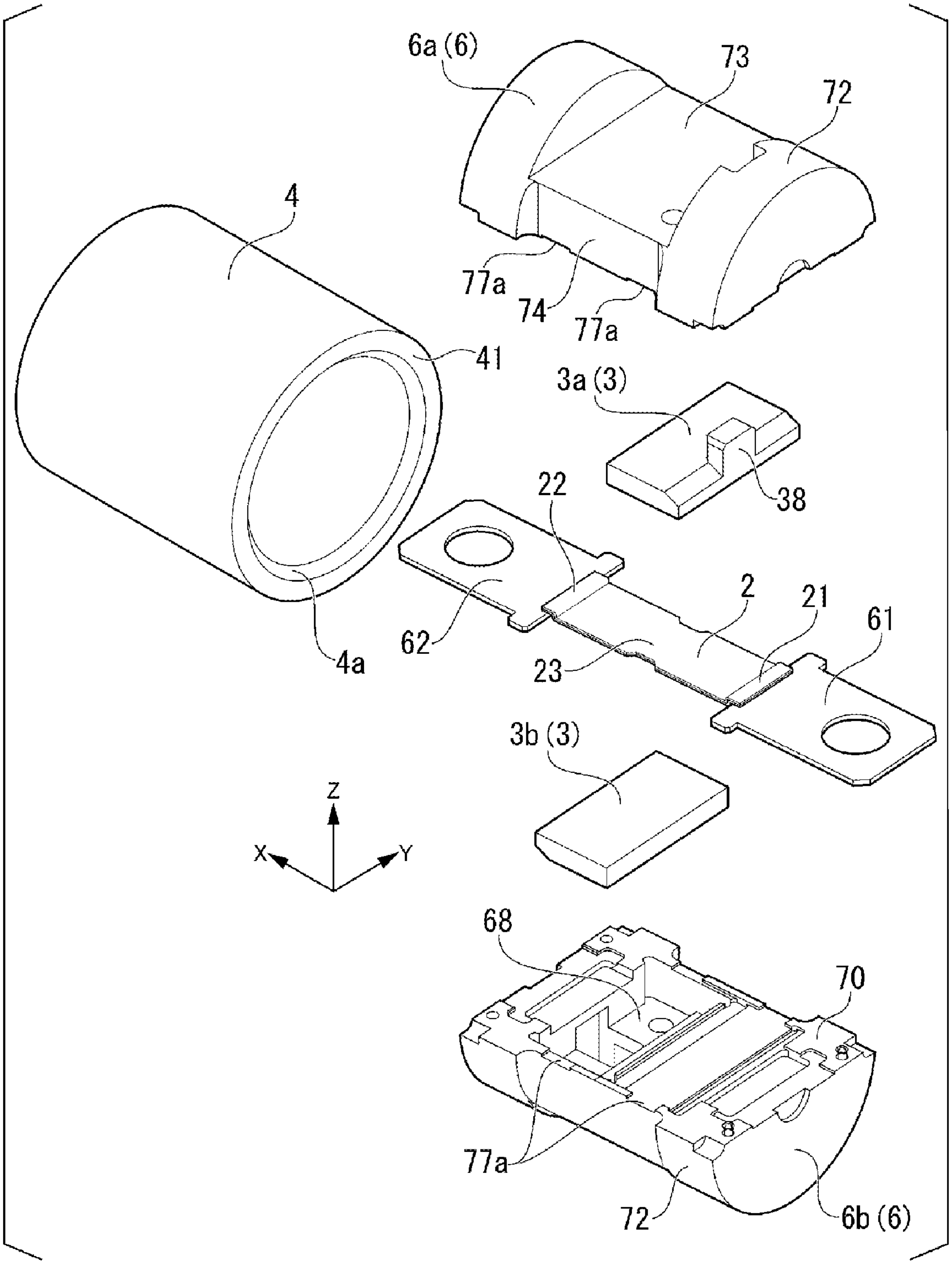
FIG. 2 is an exploded perspective view illustrating the overall structure of the protective element 100 illustrated in FIG. 1.
Figure 3:
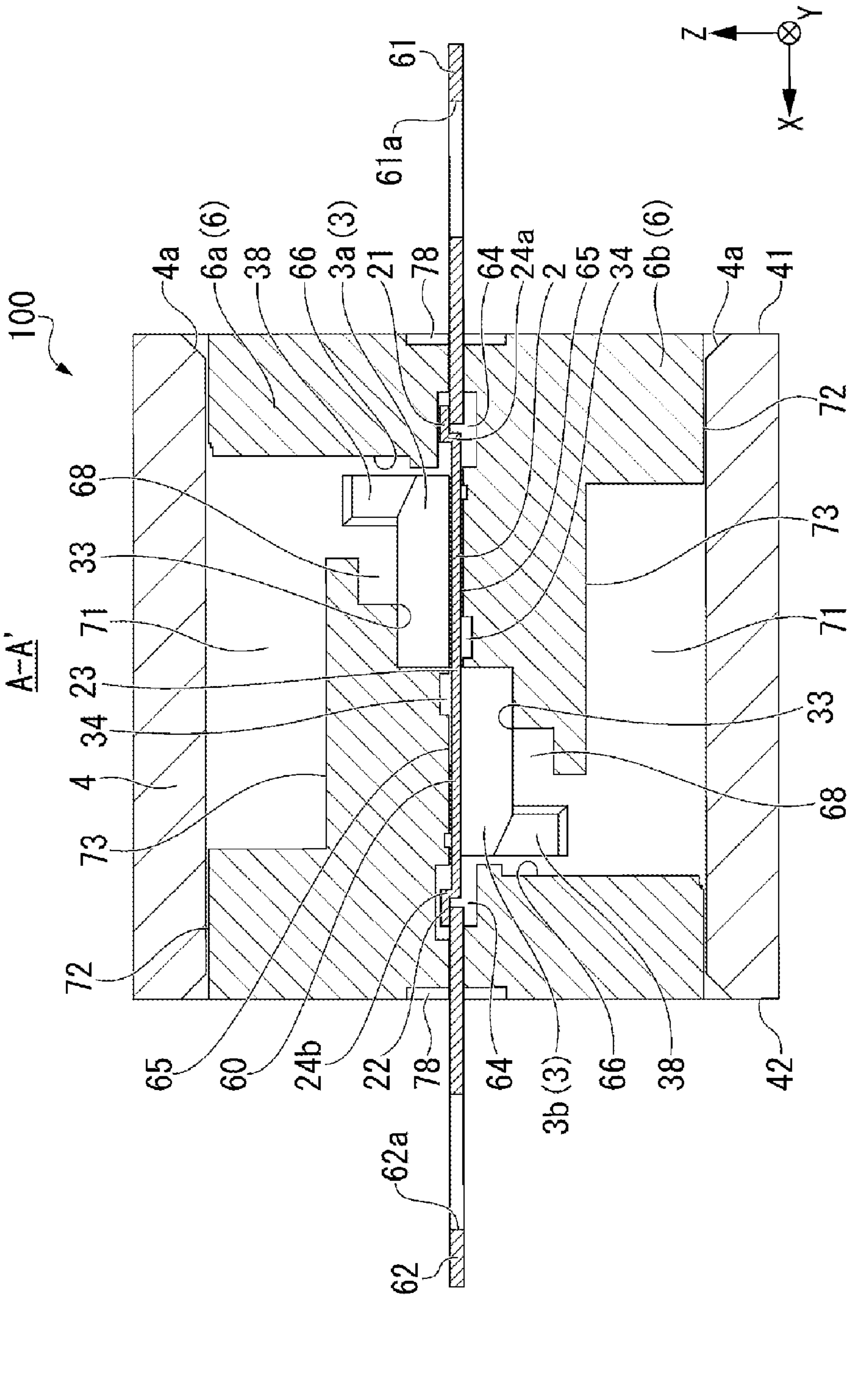
FIG. 3 is a sectional view in which the protective element 100 of the first embodiment is cut along line A-A' illustrated in FIG. 1.
Figure 4:
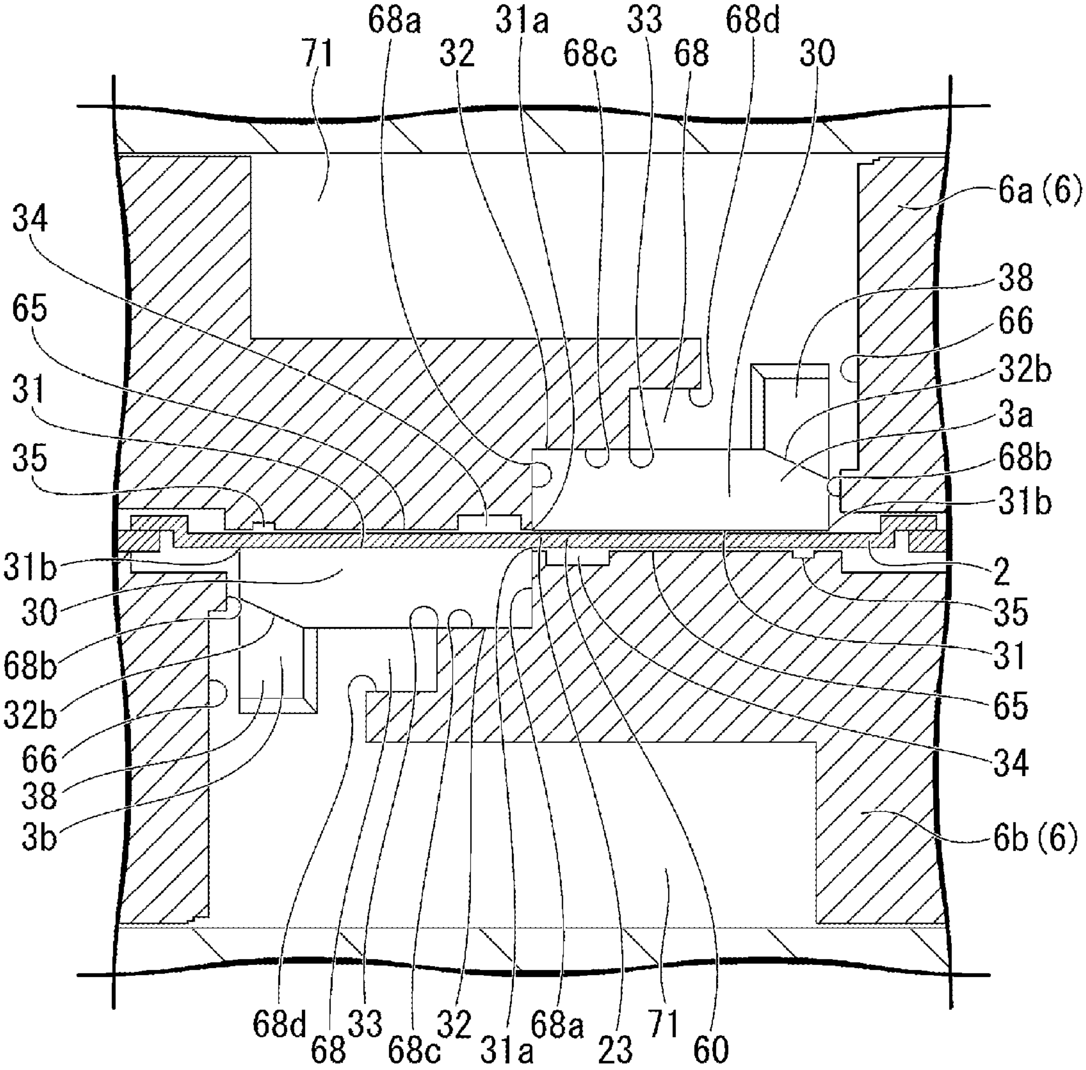
FIG. 4 is an enlarged sectional view illustrating a portion of FIG. 3 in an enlarged manner.
Figure 5:
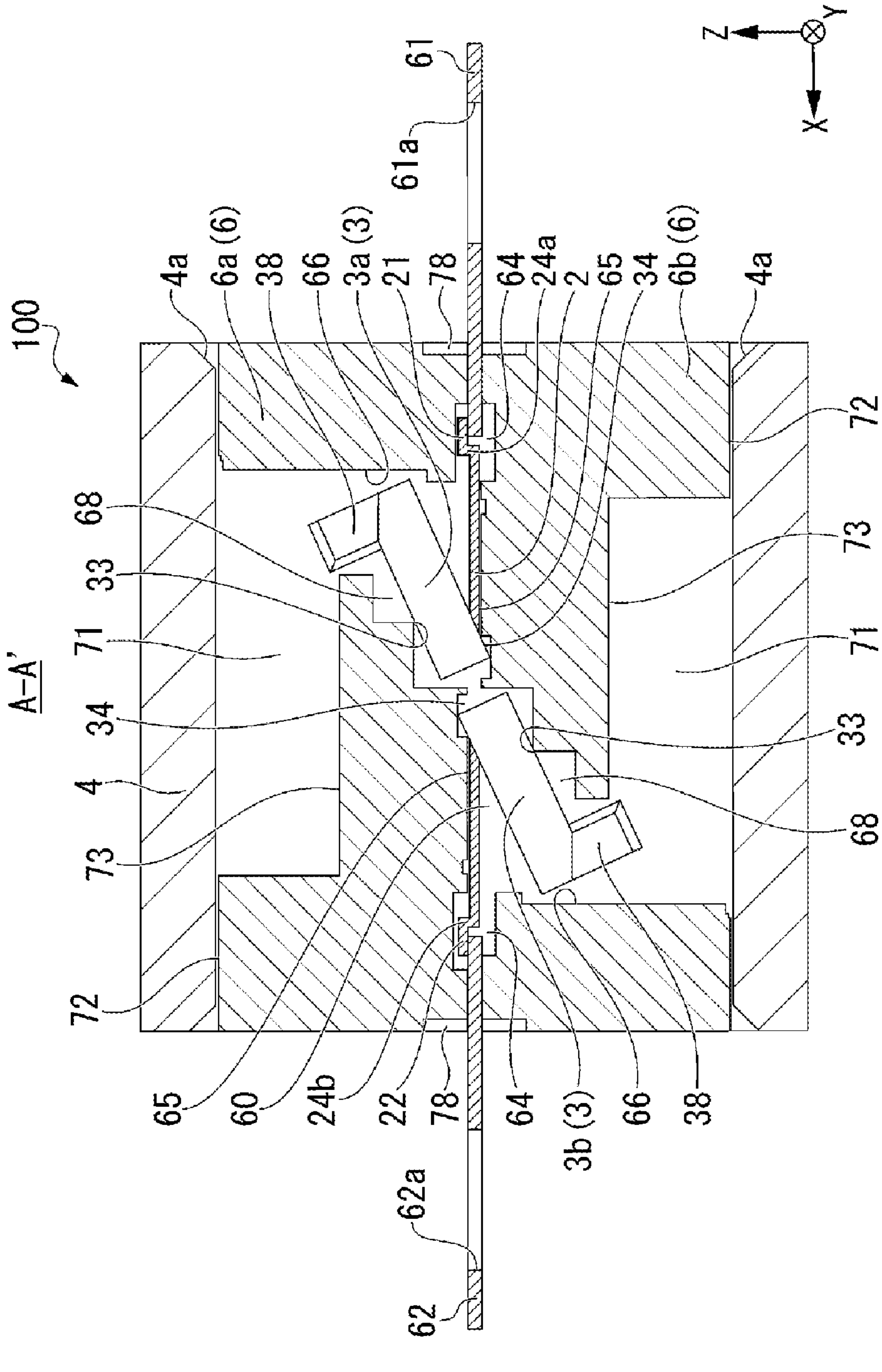
FIG. 5 is a diagram for describing operations of the protective element 100 of the first embodiment and is a sectional view cut along line A-A' illustrated in FIG. 1.
Figure 6:
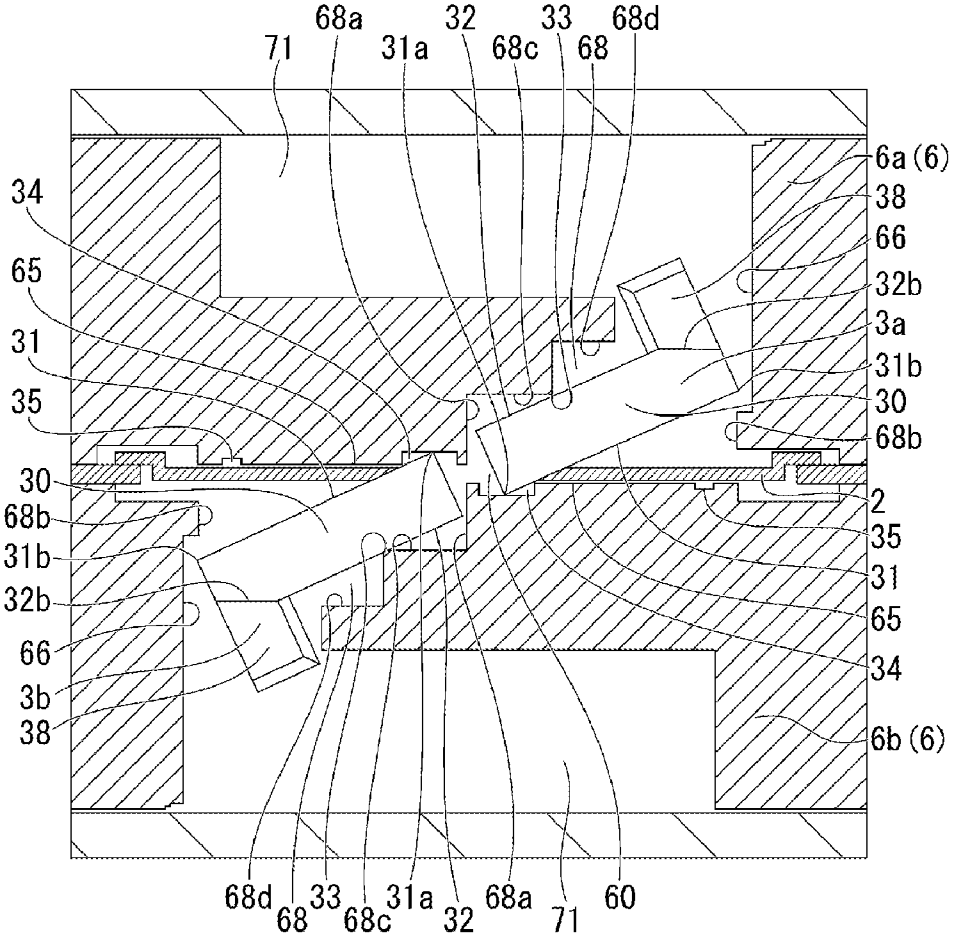
FIG. 6 is an enlarged sectional view illustrating a portion of FIG. 5 in an enlarged manner.

FIG. 1 is a perspective view illustrating the overall structure of a protective element 100 of the first embodiment. FIG. 2 is an exploded perspective view illustrating the overall structure of the protective element 100 illustrated in FIG. 1. FIG. 3 is a sectional view in which the protective element 100 of the first embodiment is cut along line A-A' illustrated in FIG. 1. FIG. 4 is an enlarged sectional view illustrating a portion of FIG. 3 in an enlarged manner. FIG. 5 is a diagram for describing operations of the protective element 100 of the first embodiment and is a sectional view cut along line A-A' illustrated in FIG. 1. FIG. 6 is an enlarged sectional view illustrating a portion of FIG. 5 in an enlarged manner.

As illustrated in FIG. 1 to FIG. 3, the protective element 100 of the present embodiment is provided with a fuse element 2, a shielding member 3, a case 6 having therein a housing portion 60 storing the fuse element 2 and the shielding member 3, and a cover 4 covering Y-direction and Z-direction lateral faces of the case 6.

As illustrated in FIG. 5 and FIG. 6, in the protective element 100 of the present embodiment, a pressure increase in the housing portion 60 due to an arc discharged when the fuse element 2 fuses causes the shielding member 3 to rotate around a rotational axis 33, and the shielding member 3 divides the interior of the housing portion 60.

(Fuse Element)

Figure 7:
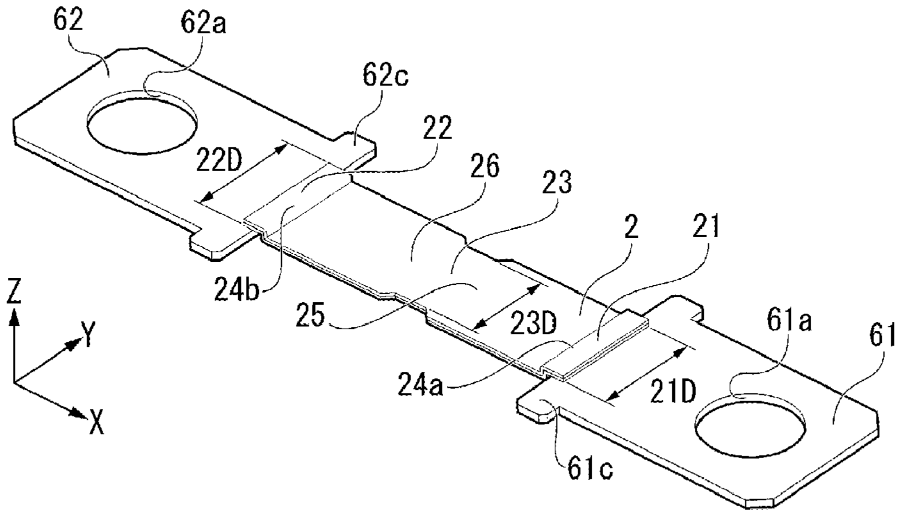
FIG. 7 is an enlarged view for describing a portion of the protective element 100 of the first embodiment and is a perspective view illustrating a fuse element, a first terminal, and a second terminal.

FIG. 7 is an enlarged view for describing a portion of the protective element 100 of the first embodiment and is a perspective view illustrating the fuse element, a first terminal, and a second terminal.

As illustrated in FIG. 7, the fuse element 2 is band-shaped and has a first end portion 21, a second end portion 22, and a cutting portion 23 that is a constricted portion provided between the first end portion 21 and the second end portion 22. The fuse element 2 is energized in the X direction (first direction), which is the direction heading from the first end portion 21 to the second end portion 22.

As illustrated in FIG. 3 and FIG. 7, the first end portion 21 is electrically connected to a first terminal 61. The second end portion 22 is electrically connected to a second terminal 62.

As illustrated in FIG. 7, the first terminal 61 and the second terminal 62 may be substantially identical in shape or have respectively different shapes. A thickness of the first terminal 61 and the second terminal 62 is not limited in particular, and 0.3 to 1.0 mm can be given as a general thickness. The thickness of the first terminal 61 and the thickness of the second terminal 62 may be identical, as illustrated in FIG. 3, or different.

As illustrated in FIG. 1 to FIG. 3 and FIG. 7, the first terminal 61 is provided with an external terminal hole 61*a*. Moreover, the second terminal 62 is provided with an external terminal hole 62*a*. Among the external terminal hole 61*a* and the external terminal hole 62*a*, one is used to connect to a power-source side, and the other is used to connect to a load side. As illustrated in FIG. 7, the external terminal hole 61*a* and the external terminal hole 62*a* can be through holes that are substantially circular in a plan view.

As the first terminal 61 and the second terminal 62, those made of, for example, copper, brass, or nickel can be used. As the material of the first terminal 61 and the second terminal 62, from a viewpoint of increasing rigidity, it is preferable to use brass. From a viewpoint of decreasing electrical resistance, it is preferable to use copper. The first terminal 61 and the second terminal 62 may be made of the same material or different materials.

It is sufficient for the shape of the first terminal 61 and the second terminal 62 to be a shape that can engage with a power-source-side terminal or load-side terminal that is not illustrated. For example, the shape may be a claw shape having an opened portion in a portion thereof. Alternatively, as illustrated in FIG. 7, a flange portion (indicated by reference signs 61*c*, 62*c* in FIG. 7) that is widened on both sides and faces the fuse element 2 may be provided on an end portion on a side connected to the fuse element 2. The shape of the terminals is not limited in particular. When the first terminal 61 and the second terminal 62 have the flange portions 61*c*, 62*c*, the first terminal 61 and the second terminal 62 are less likely to fall out of the case 6. This provides a protective element 100 with favorable reliability and durability.

The fuse element 2 illustrated in FIG. 7 has a substantially uniform thickness (Z-direction length). The thickness of the fuse element 2 may be uniform, as illustrated in FIG. 3, or partially different. As a fuse element whose thickness is partially different, for example, one whose thickness gradually thickens in heading from the cutting portion 23 to the first end portion 21 and the second end portion 22 can be mentioned. In such a fuse element, when an overcurrent flows, the cutting portion 23 becomes a hot spot. The cutting portion 23 rises in temperature with priority, is softened, and is cut more reliably.

The thickness of the fuse element 2 can be made to be, for example, 0.03 to 1.0 mm—preferably 0.2 to 0.5 mm.

As illustrated in FIG. 7, the fuse element 2 has a shape that is substantially rectangular in a plan view. As illustrated in FIG. 7, a Y-direction width 21D of the first end portion 21 and a Y-direction width 22D of the second end portion 22 are substantially identical. Therefore, the Y-direction width of the fuse element 2 illustrated in FIG. 7 signifies the Y-direction widths 21D, 22D of the first end portion 21 and the second end portion 22.

As illustrated in FIG. 1, FIG. 3, and FIG. 7, the first end portion 21 of the fuse element 2 is disposed overlapping the first terminal 61 in a plan view. Moreover, the second end portion 22 of the fuse element 2 is disposed overlapping the second terminal 62 in a plan view.

As illustrated in FIG. 7, the X-direction length of the first end portion 21 extends from a region overlapping the first terminal 61 in a plan view to a cutting-portion 23 side. Moreover, as illustrated in FIG. 7, the X-direction length of the second end portion 22 extends from a region overlapping the second terminal 62 in a plan view to a cutting-portion 23 side. In the fuse element 2 illustrated in FIG. 7, the X-direction length of the second end portion 22 and the X-direction length of the first end portion 21 are substantially identical. In other words, in the present embodiment, the cutting portion 23 is disposed in the X-direction center of the fuse element 2.

As illustrated in FIG. 7, a first linking portion 25 that is substantially trapezoidal in a plan view is disposed between the cutting portion 23 and the first end portion 21. The longer of the parallel sides of the first linking portion 25 that is substantially trapezoidal in a plan view is joined to the first end portion 21. Moreover, a second linking portion 26 that is substantially trapezoidal in a plan view is disposed between the cutting portion 23 and the second end portion 22. The longer of the parallel sides of the second linking portion 26 that is substantially trapezoidal in a plan view is joined to the second end portion 22. The first linking portion 25 and the second linking portion 26 are symmetrical via the cutting portion 23. Thus, the Y-direction width of the fuse element 2 gradually widens in heading from the cutting portion 23 to the first end portion 21 and the second end portion 22. As a result, when an overcurrent flows in the fuse element 2, the cutting portion 23 becomes a hot spot. The cutting portion 23 rises in temperature with priority, is softened, and is easily cut or fused.

As illustrated in FIG. 7, the Y-direction width 23D of the cutting portion 23 of the fuse element 2 is narrower than the Y-direction widths 21D, 22D of the first end portion 21 and the second end portion 22. Thus, the Y-direction sectional area of the cutting portion 23 is smaller than sectional areas of regions other than the cutting portion 23 of the fuse element 2. Therefore, the cutting portion 23 is made more likely to be cut or fuse than the region between the cutting portion 23 and the first end portion 21 and the region between the cutting portion 23 and the second end portion 22.

In the present embodiment, as the fuse element 2, one having a cutting portion 23 that is a constricted portion of a narrower Y-direction width 23D than the Y-direction widths 21D, 22D of the first end portion 21 and the second end portion 22 is described as an example, as illustrated in FIG. 7. However, the Y-direction width of the cutting portion may be identical to the first end portion and the second end portion, and the fuse element is not limited to one in which the Y-direction width of the cutting portion is narrower than the first end portion and the second end portion.

For example, it is also possible to provide a line-shaped or band-shaped fuse element with a uniform Y-direction sectional area instead of the fuse element 2 illustrated in FIG. 7. In this situation, the Y-direction (second-direction) sectional area of the cutting portion of the fuse element is identical to sectional areas of regions other than the cutting portion of the fuse element.

As illustrated in FIG. 3 and FIG. 7, the fuse element 2 has two bent portions-a first bent portion 24*a* and a second bent portion 24*b*-whereat the band-shaped member is bent twice at substantially right angles along the Y direction. The first bent portion 24*a* is a step that is formed, along an edge portion of the region in which the first end portion 21 and the first terminal 61 overlap in a plan view, to cover an end face of the first terminal 61. The second bent portion 24*b* is a step that is formed, along an edge portion of the region in which the second end portion 22 and the second terminal 62 overlap in a plan view, to cover an end face of the second terminal 62. The first bent portion 24*a* and the second bent portion 24*b* mitigate stress accompanying thermal expansion and contraction of the fuse element 2 extending in the X direction and improve the durability of the fuse element 2.

In the present embodiment, as illustrated in FIG. 3, the fuse element 2 has the first bent portion 24*a* and the second bent portion 24*b*. Thus, a face of the first terminal 61 whereon the first end portion 21 is not stacked, a face of the second terminal 62 whereon the second end portion 22 is not stacked, and one face in the central portion of the fuse element 2 (face on lower side in FIG. 3) are disposed to be substantially coplanar.

In the present embodiment, as illustrated in FIG. 7, the first bent portion 24*a* and the second bent portion 24*b*, which are the band-shaped member bent along the Y direction, are described as examples of the bent portion. However, it is sufficient for the direction in which the band-shaped material forming the bent portion is bent to be a direction intersecting the X direction, and this bending direction is not limited to the Y direction.

Moreover, in the present embodiment, the first bent portion 24*a* and the second bent portion 24*b*, which are the band-shaped member bent twice at substantially right angles, are described as examples of the bent portion. However, the bending angle and the number of bends of the band-shaped material forming the bent portion are not particularly limited.

Furthermore, in the present embodiment, an example is described in which the first bent portion 24*a* is provided on a first-end-portion 21 side of the fuse element 2 and the second bent portion 24*b* is provided on a second-end-portion 22 side. However, the number of bent portions provided in the fuse element may be one or may be three or more. Alternatively, the fuse element may be provided with no bent portion.

As the material of the fuse element 2, known materials used as a fuse element, such as metal materials including alloys, can be used. Specifically, as the material of the fuse element 2, an alloy such as Pb 85%/Sn or Sn/Ag 3%/Cu 0.5% can be illustrated.

The fuse element 2 is preferably a stacked body in which an inner layer that is a low-melting-point metal and an outer layer that is a high-melting-point metal are stacked in the thickness direction. Such a fuse element 2 exhibits favorable solderability when soldering the first terminal 61 and the second terminal 62 to the fuse element 2 and thus is preferable.

When the fuse element 2 is the stacked body in which the inner layer that is the low-melting-point metal and the outer layer that is the high-melting-point metal are stacked in the thickness direction, the volume of the low-melting-point metal being greater than the volume of the high-melting-point metal is preferable in terms of current cutoff characteristics of the fuse element 2.

As the low-melting-point metal used as a material of the fuse element 2, Sn or a metal whose main component is Sn is preferably used. Because the melting point of Sn is 232° C., the metal whose main component is Sn has a low melting point and softens at a low temperature. For example, the solidus of the Sn/Ag 3%/Cu 0.5% alloy is 217° C.

Here, "low melting point" is preferably in a range of 120° C. to 260° C. Moreover, "main component" refers to being contained at 50% or more by mass.

As the high-melting-point metal used as a material of the fuse element 2, Ag or Cu or a metal whose main component is Ag or Cu is preferably used. For example, because the melting point of Ag is 962° C., a layer of the metal whose main component is Ag maintains rigidity at temperatures whereat the layer of the low-melting-point metal softens.

Moreover, forming the metal whose main component is Ag as the outer layer is preferable because a resistance value of the fuse element 2 can be efficiently reduced and the rated current of the protective element can be set high.

Here, "high melting point" is preferably in a range of 800° C. to 1,200° C. Moreover, "main component" refers to being contained at 90% or more by mass.

When the fuse element 2 is the stacked body in which the inner layer that is the low-melting-point metal and the outer layer that is the high-melting-point metal are stacked in the thickness direction and has the cutting portion 23 that is the constricted portion in which the Y-direction width 23D is narrower than the Y-direction widths 21D, 22D of the first end portion 21 and the second end portion 22, the outer layer may—but does not have to—be formed on Y-direction lateral faces of the cutting portion 23.

The fuse element 2 of the protective element 100 of the present embodiment preferably has a melting temperature of 600° C. or lower—more preferably 400° C. or lower. When the melting temperature is 600° C. or lower, the arc discharged when the fuse element 2 fuses becomes even smaller.

It is possible to use only one fuse element 2. It is also possible to use a plurality of stacked fuse elements as necessary. In the present embodiment, an example is described in which two stacked fuse elements are used as the fuse element 2. However, it is possible to use only one fuse element, and three or more stacked fuse elements may also be used.

The fuse element 2 can be produced by a known method.

For example, when the fuse element 2 is the stacked body in which the inner layer that is the low-melting-point metal and the outer layer that is the high-melting-point metal are stacked in the thickness direction and has no outer layer formed on the Y-direction lateral faces of the cutting portion 23 that is the constricted portion, the fuse element can be produced by the method illustrated below. First, a metal foil made of the low-melting-point metal is prepared. Next, the high-melting-point metal layer is formed by plating on the entire surface of the metal foil to form a stacked plate. Afterward, the stacked plate is cut into a predetermined shape having the cutting portion 23 that is the constricted portion. The above steps provide a fuse element 2 that is a stacked body of a three-layer structure.

When producing a fuse element 2 that is made of the above stacked body, has the cutting portion 23 that is the constricted portion, and has the outer layer formed on the Y-direction lateral faces of the cutting portion 23, the fuse element can be produced by the method illustrated below. That is, the metal foil made of the low-melting-point metal is prepared, and the metal foil is cut into a predetermined shape. Next, the high-melting-point metal layer is formed by plating on the entire surface of the metal foil to form a stacked plate. The above steps provide a fuse element 2 that is a stacked body of a three-layer structure.

(Shielding Member)

As illustrated in FIG. 1 to FIG. 6, the shielding member 3 is made of a first shielding member 3*a* and a second shielding member 3*b* of the same shape as the first shielding member 3*a*. In the present embodiment, the first shielding member 3*a* and the second shielding member 3*b* have the same shape. Thus, producing these using the same material can reduce the types of components to produce and is preferable. The first shielding member 3*a* and the second shielding member 3*b* may be formed of different materials.

In the present embodiment, an example is described in which two shielding members—the first shielding member 3*a* and the second shielding member 3*b*—are provided as the shielding member 3. However, it is possible for the shielding member 3 to be only one among the first shielding member 3*a* and the second shielding member 3*b*.

In the present embodiment, two shielding members—the first shielding member 3*a* and the second shielding member 3*b*—are provided as the shielding member 3. Thus, the pressure increase in the housing portion 60 when the fuse element 2 fuses rotates the first shielding member 3*a* and the second shielding member 3*b*. Moreover, the first shielding member 3*a* divides the interior of the housing portion 60, and the second shielding member 3*b* divides the interior of the housing portion 60. As such, when the shielding member 3 has the two shielding members that are the first shielding member 3*a* and the second shielding member 3*b*, compared to a situation in which the shielding member 3 is only one among the first shielding member 3*a* and the second shielding member 3*b*, the arc discharged when the fuse element 2 fuses is suppressed (extinguished) more rapidly and reliably.

As illustrated in FIG. 3 and FIG. 4, in the present embodiment, the second shielding member 3*b* is disposed in a position having point symmetry with the first shielding member 3*a* via the X-direction center of the fuse element 2 in the A-A' section. That is, the first shielding member 3*a* and the second shielding member 3*b* are disposed to be symmetrical across the X direction via the X-direction center of the fuse element 2. Therefore, in the protective element 100 of the present embodiment, even if the first shielding member 3*a* and the second shielding member 3*b* rotate simultaneously due to the pressure increase in the housing portion 60 when the fuse element 2 fuses, the shielding members do not interfere with each other and do not hinder each other's rotational movement. Therefore, the interior of the housing portion 60 is divided more reliably, by the first shielding member 3*a* and the second shielding member 3*b*, in two locations in the X direction in the housing portion 60. Moreover, prior to moving rotationally, the first shielding member 3*a* and the second shielding member 3*b* can be disposed stably in a predetermined position in the housing portion 60 together with the fuse element 2. This provides the protective element 100 with excellent reliability.

In fact, in the present embodiment, the fuse element 2 has the cutting portion 23 between the first end portion 21 and the second end portion 22, and, as illustrated in FIG. 5 and FIG. 6, the first shielding member 3*a* and the second shielding member 3*b* rotating causes the first shielding member 3*a* and the second shielding member 3*b* to divide the interior of the housing portion 60 at two locations that interpose the cutting portion 23 and are close to each other in the X direction in the housing portion 60. As a result, the arc discharged when the fuse element 2 fuses is suppressed (extinguished) more rapidly and reliably.

Figure 8A:
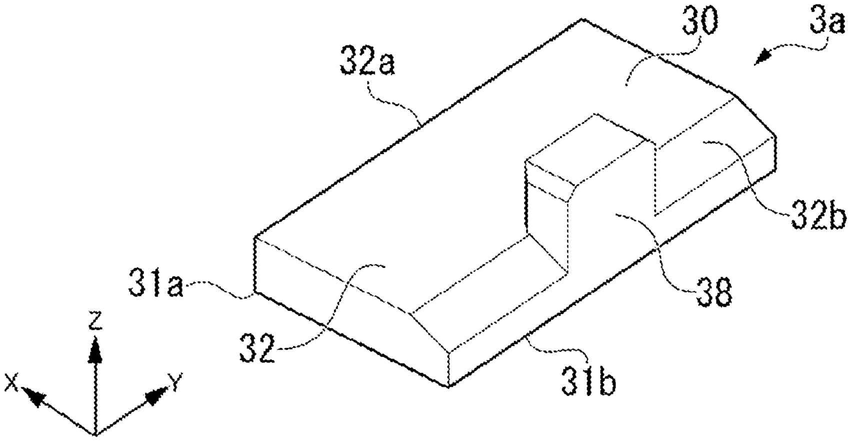
FIG. 8A is a drawing for describing the structure of a first shielding member 3*a* provided in the protective element 100 of the first embodiment and is a perspective view viewed from a housing-portion side.
Figure 8B:
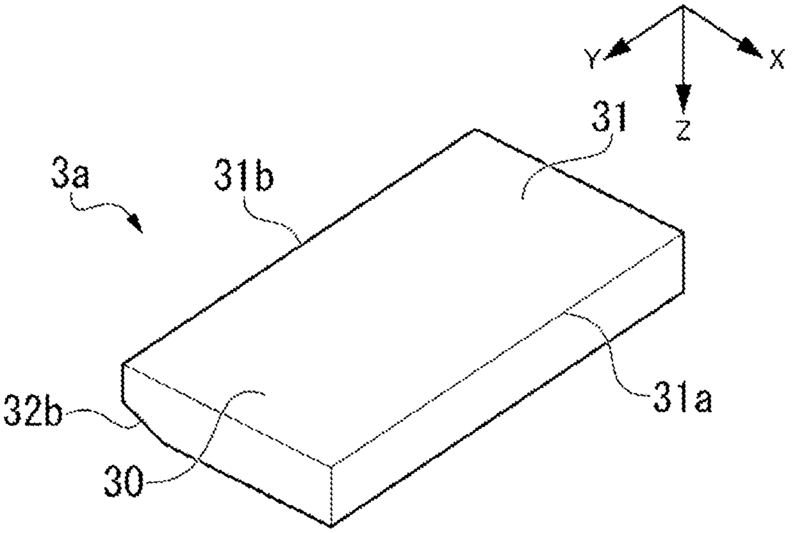
FIG. 8B is a drawing for describing the structure of the first shielding member 3*a* provided in the protective element 100 of the first embodiment and is a perspective view viewed from a fuse-element side.
Figure 9:
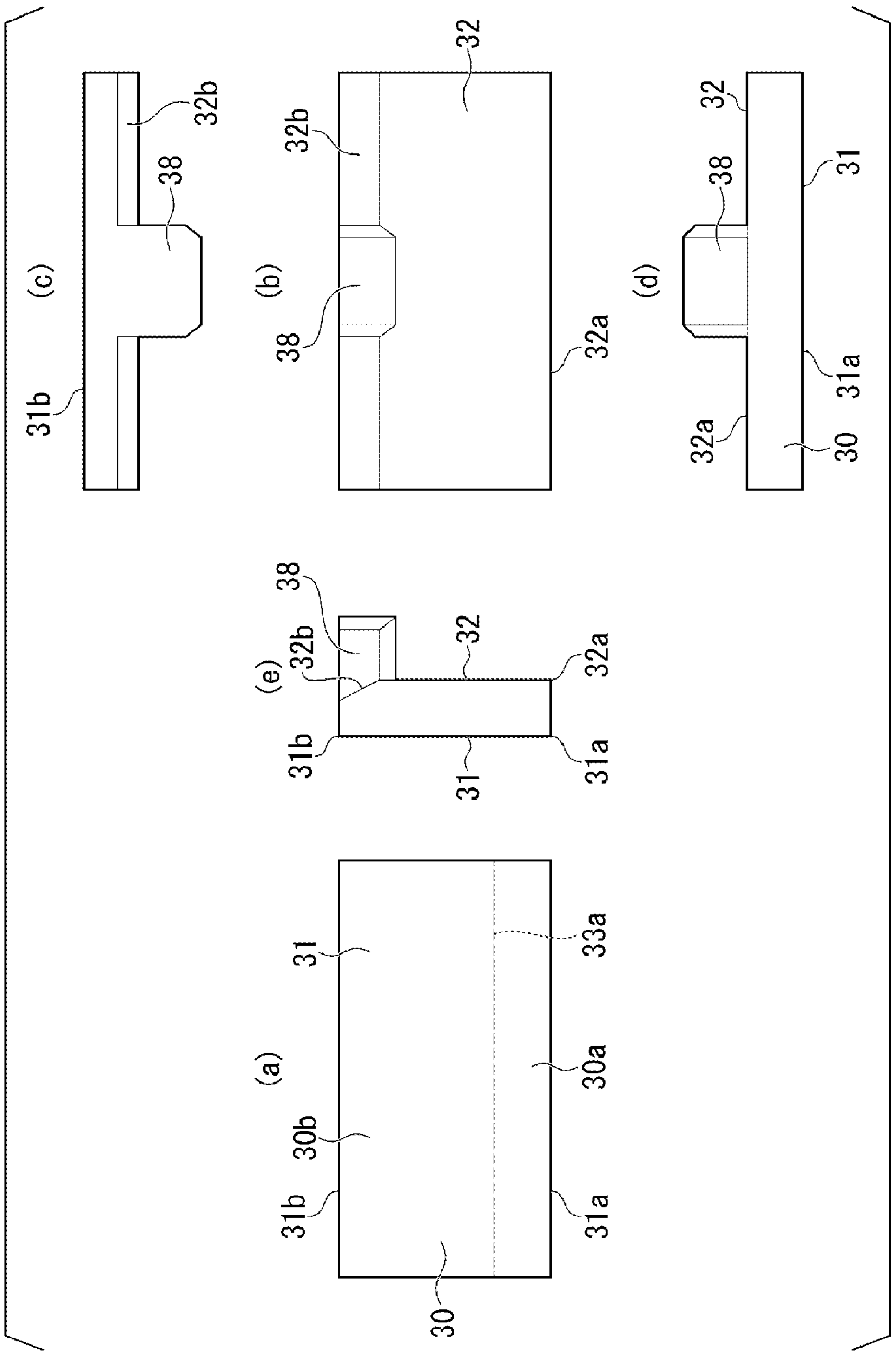
FIG. 9 is a drawing for describing the structure of the first shielding member 3*a* provided in the protective element 100 of the first embodiment. (a) is a plan view viewed from the fuse-element side, (b) is a plan view viewed from the housing-portion side, and (c) to (e) are side views.

In the present embodiment, the structure of the first shielding member 3*a* is described using FIG. 8A to FIG. 8B and FIG. 9. The structure of the second shielding member 3*b* is the same as the first shielding member 3*a*, and description is thus omitted.

FIG. 8A to FIG. 8B are drawings for describing the structure of the first shielding member 3*a* provided in the protective element 100 of the first embodiment. FIG. 8A is a perspective view viewed from a housing-portion side, and FIG. 8B is a perspective view viewed from a fuse-element side. FIG. 9 is a drawing for describing the structure of the first shielding member 3*a* provided in the protective element 100 of the first embodiment. (a) is a plan view viewed from the fuse-element side, (b) is a plan view viewed from the housing-portion side, and (c) to (e) are side views.

The first shielding member 3*a* is interposed by the fuse element 2 and a first case 6*a* that includes the housing portion 60. "Fuse-element side" refers to the side of the first shielding member 3*a* whereon the fuse element 2 is disposed. "Housing-portion side" refers to the side of the first shielding member 3*a* whereon the first case 6*a* including the housing portion 60 is disposed.

As illustrated in FIG. 1 to FIG. 9, the first shielding member 3*a* has a plate-shaped portion 30. The plate-shaped portion 30 is substantially rectangular in a plan view and, as illustrated in FIG. 4, has a first face 31 disposed opposing the fuse element 2 and a second face 32 disposed opposing the bottom face (first bottom face 68*c* or second bottom face 68*d*) of a concave portion 68 formed in the housing portion 60 of the case 6.

The first face 31 of the plate-shaped portion 30 is disposed close to or touching the fuse element 2 and, as illustrated in FIG. 3 and FIG. 4, is preferably disposed touching the fuse element 2. More preferably, the entire first face 31 is disposed touching the fuse element 2. When the first face 31 and the fuse element 2 are disposed so as to be touching each other, the arc discharged when the fuse element 2 fuses becomes even smaller.

As illustrated in FIG. 3 and FIG. 4, the second face 32 of the plate-shaped portion 30 is disposed touching the rotational axis 33 extending in the Y direction. In the present embodiment, as illustrated in FIG. 3 and FIG. 4, the rotational axis 33 is a step in the concave portion 68 formed in the housing portion 60 of the case 6.

In the present embodiment, as illustrated in FIG. 4, among both ends, in the X direction, of the first face 31 of the plate-shaped portion 30 of the first shielding member 3*a* illustrated in FIG. 8B and FIG. 9, a first end side 31*a* close to the rotational axis 33 is disposed on the X-direction inner side of the housing portion 60, and a second end side 31*b* far from the rotational axis 33 is disposed on the X-direction outer side of the housing portion 60. As illustrated in FIG. 6, the first shielding member 3*a* rotating presses the first end side 31*a* onto the bottom face of a shielding-member housing groove 34 provided in the inner face of the housing portion 60. The first shielding member 3*a* rotating also houses the second end side 31*b* in the concave portion 68.

In the present embodiment, as illustrated in FIG. 4, among both ends, in the X direction, of the second face 32 of the plate-shaped portion 30 of the first shielding member 3*a* illustrated in FIG. 8A and FIG. 9, a first end side 32*a* close to the rotational axis 33 is disposed on the X-direction inner side of the housing portion 60, and a second end face 32*b* disposed in a second end portion far from the rotational axis 33 is disposed on the X-direction outer side of the housing portion 60.

As illustrated in (a) in FIG. 9, in the first shielding member 3*a*, regarding the area of the plate-shaped portion 30 viewed from the fuse element 2, a first area 30*a* and a second area 30*b*, which are divided by a position 33*a* whereat the plate-shaped portion 30 and the rotational axis 33 touch, differ. Note that the position 33*a* whereat the plate-shaped portion 30 and the rotational axis 33 touch is not only a position whereat the second face 32 of the plate-shaped portion 30 touches the rotational axis 33 but also a position, on the first face 31, opposing the touching position 33*a* on the second face 32. In the present embodiment, as illustrated in (a) in FIG. 9, the first area 30*a*, which is disposed on a first-end-side 31*a* side close to the rotational axis 33, has a smaller area than the second area 30*b*, which is disposed on a second-end-side 31*b* side far from the rotational axis 33.

As illustrated in FIG. 5 and FIG. 6, the pressure increase in the housing portion 60 due to the arc discharged when the fuse element 2 fuses presses the first face 31 and causes the first shielding member 3*a* to rotate around the rotational axis 33. In the present embodiment, regarding the pressing force on the first face 31 due to the pressure increase in the housing portion 60, among the first area 30*a* and the second area 30*b* illustrated in (a) in FIG. 9, the force on the second area 30*b*, which is the larger area, is relatively stronger than the force on the first area 30*a*, which is the smaller area. Therefore, on the first face 31, the pressing force toward the second-end-side 31*b* side is stronger than the pressing force toward the first-end-side 31*a* side. Thus, as illustrated in FIG. 6, the first shielding member 3*a* rotates in a direction in which the second-end-side 31*b* side, disposed on the X-direction outer side of the housing portion 60, separates from the fuse element 2 (moves away from the fuse element 2) and the first-end-side 31*a* side, disposed on the X-direction inner side of the housing portion 60, approaches the fuse element 2.

As illustrated in FIG. 8A and (b) in FIG. 9, a convex portion 38 is erected in a Y-direction center portion of the second end face 32*b* of the second face 32. The convex portion 38 is a quadrangular pillar. One face among the lateral faces of the convex portion 38 is a flat face continuous with the X-direction lateral face of the plate-shaped portion 30.

As illustrated in FIG. 5 and FIG. 6, the convex portion 38 functions as a guide that, when the fuse element 2 fuses, is housed in a guide hole 66 and causes the first shielding member 3*a* to rotationally move to a predetermined position. Therefore, the first shielding member 3*a* having the convex portion 38 makes it easy for the first shielding member 3*a* to rotationally move to the predetermined position when the fuse element 2 fuses. As a result, the first shielding member 3*a* rotating causes the interior of the housing portion 60 to be divided more reliably.

In the present embodiment, since the convex portion 38 is disposed in the Y-direction center portion of the second end face 32*b* of the second face 32, position shifting of the first shielding member 3*a* that rotationally moves when the fuse element 2 fuses is more effectively prevented.

In the present embodiment, as illustrated in FIG. 8A and (b) and (e) in FIG. 9, the second end face 32*b* of the second face 32 is an inclined face chamfered to a width corresponding to the X-direction dimension of the convex portion 38. Thus, as illustrated in FIG. 6, entry of the convex portion 38 into the guide hole 66 accompanying the rotational movement of the first shielding member 3*a* is not impeded by the second end face 32*b* of the second face 32 abutting the second bottom face 68*d*, described below, of the concave portion 68. Therefore, the first shielding member 3*a* rotationally moves to the predetermined position with ease when the fuse element 2 fuses. Moreover, because there is no need to deepen the concave portion 68 to prevent the touching between the convex portion 38 and the second bottom face 68*d* that would arise in conjunction with the rotational movement of the first shielding member 3*a*, the protective element 100 can have a small size. Moreover, because there is no need to deepen the concave portion 68, the case 6 can be ensured to be thick and strong.

The size of the convex portion 38 is provided with dimensions that, as illustrated in FIG. 3 and FIG. 4, enable the convex portion to be housed in the concave portion 68, formed in the housing portion 60, prior to the first shielding member 3*a* rotating and, as illustrated in FIG. 5 and FIG. 6, enable the convex portion to be housed in the guide hole 66, formed in the concave portion 68, when the first shielding member 3*a* rotates. In the present embodiment, the X-direction dimension of the convex portion 38 and the length from the second face 32 to the apex of the convex portion 38 are substantially identical to the thickness of the plate-shaped portion 30, and the Y-direction dimension of the convex portion 38 is longer than the X-direction dimension.

In the present embodiment, an example is described in which the above quadrangular pillar is provided as the convex portion 38. However, the shape of the convex portion is not limited to the above quadrangular pillar and may be, for example, a square pillar. Alternatively, the Y-direction dimension may be shorter than the X-direction dimension. The shape of the convex portion may also be a pillar having a sectional shape of, for example, a circle, an oval, an ellipse, a triangle, or a hexagon.

Moreover, in the present embodiment, an example is described in which the convex portion 38 is disposed in the Y-direction center portion of the second face 32. However, the Y-direction position of the convex portion on the second face 32 does not need to be the center portion.

Furthermore, in the present embodiment, an example is described in which the shielding member has the convex portion. However, the convex portion is provided as necessary to facilitate rotational movement of the shielding member to the predetermined position and does not need to be provided. Even if the shielding member has no convex portion, the guide hole 66 is preferably provided in the concave portion 68 in order to exhaust, into an internal-pressure buffer space 71, a gas in the housing portion 60 generated by the arc discharged when the fuse element 2 fuses.

The first shielding member 3*a* and the second shielding member 3*b* are made of an insulating material. As the insulating material, a ceramic material, a resin material, or the like can be used.

As the ceramic material, alumina, mullite, zirconia, and the like can be illustrated. Preferably, alumina or another material with high thermal conductivity is used. When the first shielding member 3*a* and the second shielding member 3*b* are formed of a ceramic material or another material with high thermal conductivity, heat generated when the fuse element 2 is cut can be efficiently released to the outside. Therefore, continuation of the arc discharged when the fuse element 2 is cut is more effectively suppressed.

As the resin material, it is preferable to use any one selected from among a polyphenylene sulfide (PPS) resin, a nylon resin, a fluororesin such as polytetrafluoroethylene, and a polyphthalamide (PPA) resin. It is particularly preferable to use the nylon resin.

As the nylon resin, an aliphatic polyamide may be used, or a semi-aromatic polyamide may be used. When the aliphatic polyamide, which includes no benzene ring, is used as the nylon resin, compared to using the semi-aromatic polyamide, which has a benzene ring, graphite is less likely to be produced even if the first shielding member 3*a* and/or the second shielding member 3*b* is burned by the arc discharged when the fuse element 2 fuses. As such, using the aliphatic polyamide to form the first shielding member 3*a* and the second shielding member 3*b* can prevent a new electrical transmission path from being formed by the graphite generated when the fuse element 2 fuses.

As the aliphatic polyamide, for example, nylon 4, nylon 6, nylon 46, or nylon 66 can be used.

As the semi-aromatic polyamide, for example, nylon 6T or nylon 9T can be used.

Among these nylon resins, it is preferable to use a resin including no benzene ring, such as the aliphatic polyamides including nylon 4, nylon 6, nylon 46, and nylon 66. Using nylon 46 or nylon 66 is more preferable due to their excellent heat resistance.

For example, when the shielding member 3, the case 6, and the cover 4 in the protective element 100 are made of the aliphatic polyamide nylon 66, compared to when these are made of the semi-aromatic polyamide nylon 9T, which has a benzene ring, the insulation resistance after current cutoff is 10 to 10,000 times greater.

As the resin material, it is preferable to use one whose tracking resistance index CTI is 400 V or higher, 600 V or higher being more preferable. The tracking resistance can be found by a test based on IEC 60112.

The nylon resin has particularly high tracking resistance (resistance against tracking (carbonized conduction path) breakdown) even among the resin materials and thus is preferable.

As the resin material, it is preferable to use one whose glass-transition temperature is high. The "glass-transition temperature" (Tg) of the resin material refers to the temperature of transitioning from a soft, rubber state to a hard, glass state. When the resin is heated to the glass-transition temperature or higher, it becomes easier for the molecules to move, and the resin enters the soft, rubber state. Meanwhile, as the resin cools, molecular movement is restricted, and the resin enters the hard, glass state.

The first shielding member 3*a* and the second shielding member 3*b* can be produced by a known method.

(Case)

As illustrated in FIG. 1 to FIG. 3, the case 6 is substantially a circular pillar. The case 6 is made of the first case 6*a* and a second case 6*b*. The first case 6*a* and the second case 6*b* are disposed opposing each other via the fuse element 2. Portions of the first terminal 61 and the second terminal 62 are interposed between the first case 6*a* and the second case 6*b* and are fixed by the cover 4. The first terminal 61 is interposed on a first end side in the X direction of the case 6, and the second terminal 62 is held on a second end side in the X direction of the case 6.

As illustrated in FIG. 1 to FIG. 3, the first case 6*a* and the second case 6*b* have the same shape and are substantially semicircular pillars. In the present embodiment, the first case 6*a* and the second case 6*b* have the same shape. Thus, producing these using the same material can reduce the types of components to produce and is preferable. The first case 6*a* and the second case 6*b* may be formed of different materials.

In the present embodiment, the first case 6*a* and the second case 6*b* have the same shape and are disposed opposing each other via the fuse element 2. Thus, the stress due to the pressure increase in the housing portion 60 when the fuse element 2 fuses is dispersed and loaded evenly across the first case 6*a* and the second case 6*b*. Thus, the case 6 has excellent strength and can effectively prevent the protective element 100 from being destroyed when the fuse element 2 fuses.

As illustrated in FIG. 1 to FIG. 3, the housing portion 60 is provided inside the case 6. The housing portion 60 is formed by the first case 6*a* and the second case 6*b* being integrated. The fuse element 2, the first shielding member 3*a*, and the second shielding member 3*b* are stored in the housing portion 60.

As illustrated in FIG. 3, in the housing portion 60, two insertion holes 64 that open into the housing portion 60 are disposed opposing each other in the X direction. The two insertion holes 64 are respectively formed by the second case 6*b* and the first case 6*a* being integrated.

As illustrated in FIG. 3, the first end portion 21 of the fuse element 2 is housed in one among the two insertion holes 64, and the second end portion 22 of the fuse element 2 is housed in the other insertion hole 64.

As illustrated in FIG. 1 and FIG. 3, portions of the first terminal 61 and the second terminal 62 connected to the fuse element 2 are exposed outside the case 6.

In the present embodiment, the structure of the first case 6*a* is described using FIG. 10A to FIG. 10C and FIG. 11. The structure of the second case 6*b* is the same as the first case 6*a*, and description is thus omitted.

Figure 10A:
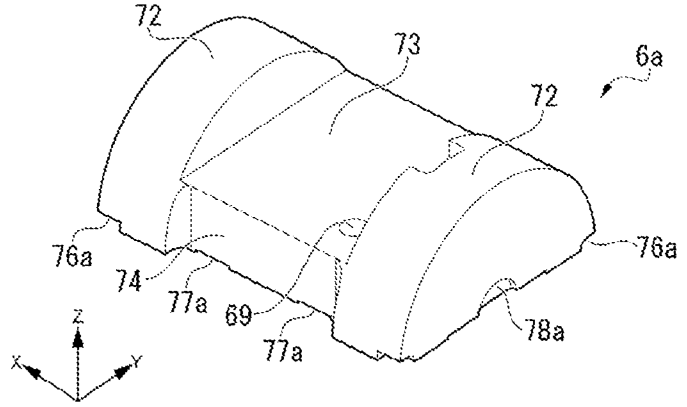
FIG. 10A is a drawing for describing the structure of a first case 6*a* provided in the protective element 100 of the first embodiment and is a perspective view viewed from an outer side.
Figure 10B:
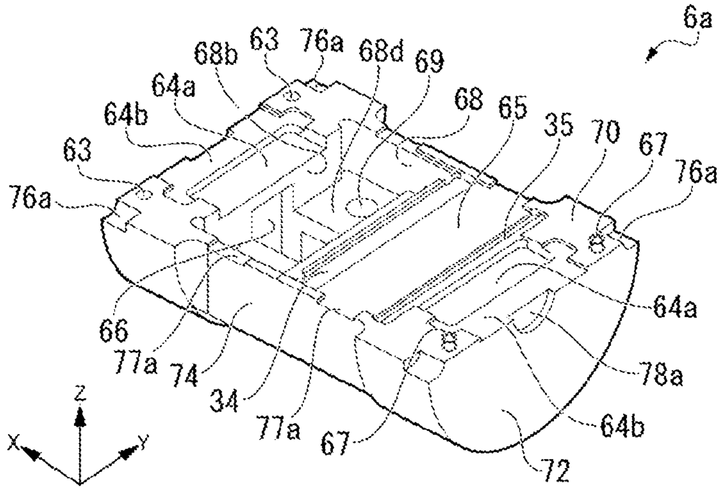
FIG. 10B is a drawing for describing the structure of the first case 6*a* provided in the protective element 100 of the first embodiment and is a perspective view of the interior of a housing portion.
Figure 10C:
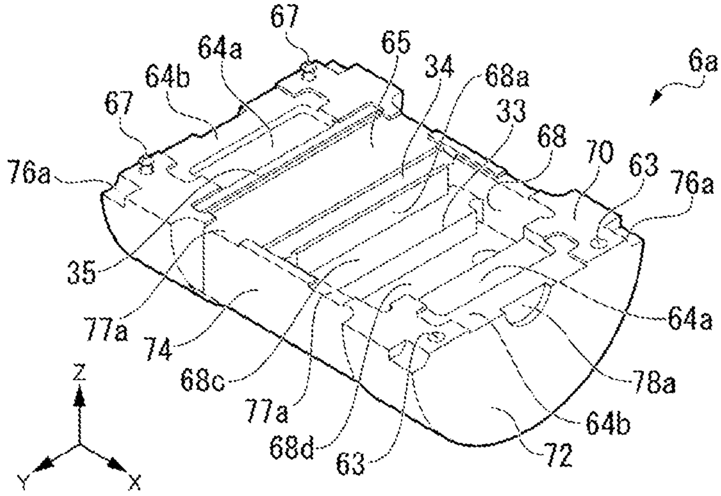
FIG. 10C is a drawing for describing the structure of the first case 6*a* provided in the protective element 100 of the first embodiment and is a perspective view of the interior of the housing portion.
Figure 11:
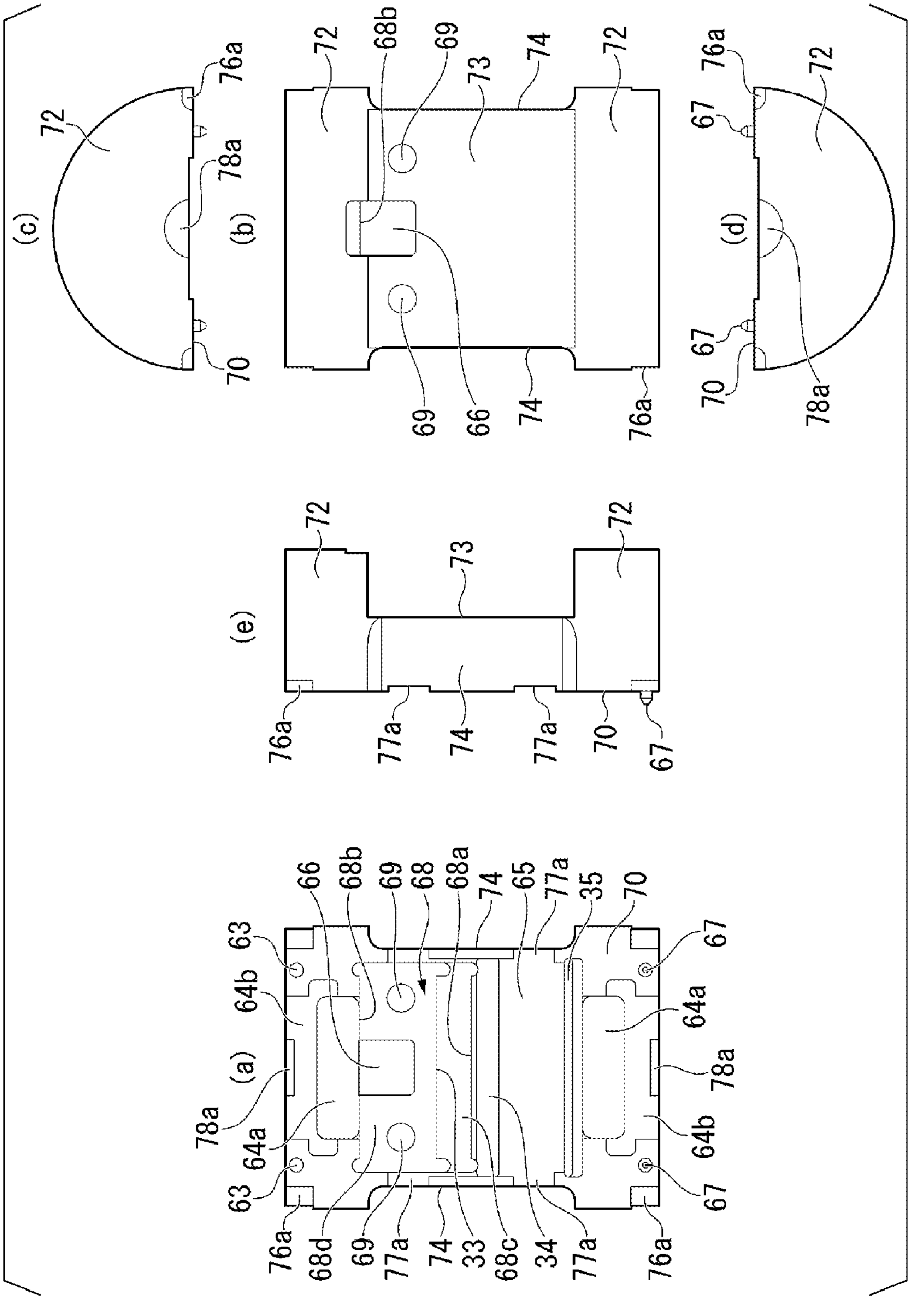
FIG. 11 is a drawing for describing the structure of the first case 6*a* provided in the protective element 100 of the first embodiment. (a) is a plan view of the interior of the housing portion of the first case 6*a* viewed from a second-case 6*b* side, (b) is a plan view viewing the first case 6*a* from the outer side, and (c) to (e) are side views of the first case 6*a*.

FIG. 10A to FIG. 10C are drawings for describing the structure of the first case 6*a* provided in the protective element 100 of the first embodiment. FIG. 10A is a perspective view viewing the first case 6*a* from the outer side, and FIG. 10B and FIG. 10C are perspective views of the interior of the housing portion of the first case 6*a*. FIG. 11 is a drawing for describing the structure of the first case 6*a* provided in the protective element 100 of the first embodiment. In FIG. 11, (a) is a plan view of the interior of the housing portion of the first case 6*a*, (b) is a plan view viewing the first case 6*a* from the outer side, and (c) to (e) are side views of the first case 6*a*.

As illustrated in FIG. 10B, FIG. 10C, and (a) in FIG. 11, the XY face opposing the second case 6*b* of the first case 6*a* is substantially a rectangle in which the X direction is the long side and the Y direction is the short side in a plan view. The shape is such that the Y-direction length in an X-direction center portion is short.

As illustrated in FIG. 10B, FIG. 10C, and (a) in FIG. 11, the concave portion 68, the shielding-member housing groove 34, and a fuse-element mounting face 65 are provided in a region of the first case 6*a* that becomes the inner face of the housing portion 60 when the first case is integrated with the second case 6*b*.

As illustrated in FIG. 10B, FIG. 10C, and (a) in FIG. 11, the concave portion 68 is substantially rectangular in a plan view. As illustrated in FIG. 4, the first shielding member 3*a* (for the second case 6*b*, the second shielding member 3*b*) is housed in the concave portion 68. In the present embodiment, as illustrated in FIG. 4, FIG. 10C, and (a) in FIG. 11, among inner wall faces of the concave portion 68, a first wall face 68*a* disposed on the X-direction inner side of the first case 6*a* is disposed in substantially the X-direction center of the first case 6*a*. Therefore, in the Z direction, the first wall face 68*a* is disposed overlapping the cutting portion 23 of the fuse element 2 (see FIG. 4).

As illustrated in FIG. 4, the bottom face of the concave portion 68 is a face opposing the second face 32 of the plate-shaped portion 30 of the first shielding member 3*a* (for the second case 6*b*, the second shielding member 3*b*). As illustrated in FIG. 10B, FIG. 10C, and (a) in FIG. 11, the bottom face of the concave portion 68 has the first bottom face 68*c*, which is disposed on a first-wall-face 68*a* side, and the second bottom face 68*d*, which is disposed toward a second wall face 68*b* side opposing the first wall face 68*a*. The first bottom face 68*c* is provided in a position closer to a face opposing the fuse element 2 in the Z direction than the second bottom face 68*d*. As illustrated in FIG. 4 and FIG. 10C, this forms a step extending in the Y direction at a boundary portion between the first bottom face 68*c* and the second bottom face 68*d*. In the present embodiment, as illustrated in FIG. 4 and FIG. 10C, the step formed in the concave portion 68 of the first case 6*a* functions as the rotational axis 33 of the first shielding member 3*a* (for the second case 6*b*, the rotational axis 33 of the second shielding member 3*b*).

As illustrated in FIG. 4 and FIG. 10C, the X-direction position of the step (rotational axis 33) formed in the concave portion 68 of the first case 6*a* is a position closer to the first wall face 68*a* than the second wall face 68*b*. Thus, as illustrated in (a) in FIG. 9, among the areas of the plate-shaped portion 30, as viewed from the fuse element 2, of the first shielding member 3*a* (for the second case 6*b*, the second shielding member 3*b*), the first area 30*a*, which is disposed—relative to the position 33*a* whereat the plate-shaped portion 30 and the rotational axis 33 touch—toward the first end side 31*a* close to the rotational axis 33, is smaller than the second area 30*b*, which is disposed toward the second end side 31*b* far from the rotational axis 33.

In the present embodiment, a ratio of the X-direction length of the first bottom face 68*c* relative to the X-direction length of the concave portion 68 (X-direction lengths of first bottom face 68*c*/concave portion 68) is substantially identical to a ratio between the area of the plate-shaped portion 30 and the first area 30*a* (areas of first area 30*a*/plate-shaped portion 30). This is less than 0.5, preferably 0.2 to 0.49, and more preferably 0.3 to 0.4.

Here, the X-direction length of the concave portion 68 is the X-direction length from the first wall face 68*a* to the second wall face 68*b* of the concave portion 68.

When the ratio of the X-direction length of the first bottom face 68*c* relative to the X-direction length of the concave portion 68 is 0.4 or less, the difference between the first area 30*a* and the second area 30*b* is sufficiently large. Thus, regarding the pressing force on the first face 31 of the plate-shaped portion 30 of the first shielding member 3*a* due to the pressure increase in the housing portion 60 as well, the difference between the second-end-side 31*b* side and the first-end-side 31*a* side is large. As such, the pressing force due to the pressure increase in the housing portion 60 is efficiently converted into a drive force that subjects the first shielding member 3*a* to rotational movement. As a result, as illustrated in FIG. 6, the first shielding member 3*a* rotates at a sufficient rotational speed in the direction in which the second-end-side 31*b* side, disposed on the X-direction outer side of the housing portion 60, separates from the fuse element 2 and the first-end-side 31*a* side, disposed on the X-direction inner side of the housing portion 60, approaches the fuse element 2. The first end side 31*a* is then pressed by a strong force onto the bottom face of the shielding-member housing groove 34 provided in the inner face of the housing portion 60. Thus, when the ratio of the X-direction length of the first bottom face 68*c* relative to the X-direction length of the concave portion 68 is 0.4 or less, the interior of the housing portion 60 is more reliably blocked and divided by the first end side 31*a* of the first face 31 of the plate-shaped portion 30, the portion of the second face 32 touching the rotational axis 33, and the lateral faces of the plate-shaped portion 30.

When the ratio of the X-direction length of the first bottom face 68*c* relative to the X-direction length of the concave portion 68 is 0.3 or more, a sufficient area can be ensured for the first bottom face 68*c*. Thus, prior to being rotationally moved, the first shielding member 3*a* can be held with even greater stability in a predetermined position in the first case 6*a* by the first bottom face 68*c*. As a result, the protective element 100 is provided with more excellent reliability.

In the present embodiment, an example is described in which the first bottom face 68*c* is disposed on the first-wall-face 68*a* side of the concave portion 68 and the second bottom face 68*d* is disposed on the second-wall-face 68*b* side. However, the second bottom face 68*d* may be disposed on the first-wall-face 68*a* side of the concave portion 68, and the first bottom face 68*c* may be disposed on the second-wall-face 68*b* side. In this situation, the X-direction position of the step (rotational axis 33) formed in the concave portion 68 of the first case 6*a* is a position closer to the second wall face 68*b* than the first wall face 68*a*. Therefore, among both ends, in the X direction, of the first face 31 of the plate-shaped portion 30 of the first shielding member 3*a*, the first end side 31*a* close to the rotational axis 33 is disposed on the X-direction outer side of the housing portion 60, and the second end side 31*b* far from the rotational axis 33 is disposed on the X-direction inner side of the housing portion 60. Moreover, the rotational direction of the first shielding member 3*a* is the opposite direction of the protective element 100 of the present embodiment.

In the present embodiment, the first bottom face 68*c* is disposed on the first-wall-face 68*a* side of the concave portion 68, and the second bottom face 68*d* is disposed on the second-wall-face 68*b* side. Thus, compared to when the second bottom face 68*d* is disposed on the first-wall-face 68*a* side and the first bottom face 68*c* is disposed on the second-wall-face 68*b* side, in the housing portion 60, the X-direction position blocked by the first shielding member 3*a* and the X-direction position blocked by the second shielding member 3*b* approach each other and become close to the cutting portion 23 (heat spot). Thus, the arc discharged when the fuse element 2 fuses is more likely to be even smaller, which is preferable.

In the present embodiment, the Y-direction length of the concave portion 68 is preferably such that the plate-shaped portion 30 of the first shielding member 3*a* fits into the concave portion 68 while touching the inner wall faces of the concave portion 68. In this situation, the pressure increase in the housing portion 60 when the fuse element 2 fuses enables the first shielding member 3*a* to rotate. In fact, by the first shielding member 3*a* rotating, the interior of the housing portion 60 is more reliably blocked and divided by the first end side 31*a* of the first face 31 of the plate-shaped portion 30, the portion of the second face 32 touching the rotational axis 33, and the lateral faces of the plate-shaped portion 30. Moreover, prior to being rotationally moved, the first shielding member 3*a* can be held with even greater stability in the predetermined position in the first case 6*a*. Specifically, a separation distance between the inner wall faces, opposing each other in the Y direction, of the concave portion 68 and the plate-shaped portion 30 is, for example, preferably 0.05 to 0.2 mm and more preferably 0.05 to 0.1 mm.

As illustrated in (a) in FIG. 11, one guide hole 66 and two bottom-face vent holes 69 are provided in the second bottom face 68*d* of the concave portion 68. As illustrated in (a) and (b) in FIG. 11, the one guide hole 66 and the two bottom-face vent holes 69 penetrate the first case 6*a* in the Z direction and open to the second bottom face 68*d* and the outer face of the first case 6*a*.

The guide hole 66 exhausts, into the internal-pressure buffer space 71, the gas in the housing portion 60 generated by the arc discharged when the fuse element 2 fuses. The guide hole 66 also functions as a guide that, together with the convex portion 38 of the first shielding member 3*a*, causes the first shielding member 3*a* to rotationally move to the predetermined position when the fuse element 2 fuses. The guide hole 66 has dimensions that enable the convex portion 38 of the first shielding member 3*a* to be housed therein when the first shielding member 3*a* rotates.

The guide hole 66 is substantially rectangular in a plan view. As illustrated in FIG. 4, FIG. 10B, and (b) in FIG. 11, an inner wall face on the X-direction outer side of the guide hole 66 is disposed in a position on the X-direction outer side relative to the second wall face 68*b* and, as illustrated in FIG. 4 and FIG. 10B, is formed extending to a position closer to a face opposing the fuse element 2 than the second bottom face 68*d*. Thus, the guide hole 66 is not obstructed by the shielding member 3 even if the first shielding member 3*a* rotationally moves when the fuse element 2 fuses and the convex portion 38 becomes housed in the guide hole 66. Therefore, the gas in the housing portion 60 generated by the arc discharge can be reliably exhausted into the internal-pressure buffer space 71. Moreover, as illustrated in FIG. 6, the first shielding member 3*a* rotating makes it easy for the second end side 31*b* of the first face 31 of the plate-shaped portion 30 to be housed in the concave portion 68 along the inner wall face of the guide hole 66. In fact, since the first case 6*a* has the second wall face 68*b*, the first case 6*a* can hold the first shielding member 3*a*, prior to rotational movement, in the predetermined position with precision and even greater stability along the second wall face 68*b*.

The bottom-face vent hole 69 is substantially cylindrical. The bottom-face vent hole 69 suppresses a pressure increase in the concave portion 68 when the fuse element 2 fuses. This also suppresses arc discharge.

In the present embodiment, an example is described in which a substantially cylindrical bottom-face vent hole 69 is provided. However, the shape of the vent hole is not limited to being substantially cylindrical and may be, for example, an oval cylinder, an elliptic cylinder, or a polygonal tube.

As illustrated in (a) in FIG. 11, the two bottom-face vent holes 69 are disposed so as to be symmetrical across the Y-direction center. Thus, when the fuse element 2 fuses, the gas in the housing portion 60 is more likely to be evenly and rapidly exhausted outside the housing portion 60 via the two bottom-face vent holes 69, which is preferable.

In the present embodiment, an example is described in which two bottom-face vent holes 69 are provided. However, the number of bottom-face vent holes is not particularly limited and may be one or may be three or more. Alternatively, no bottom-face vent hole 69 needs to be provided. When no bottom-face vent hole 69 is provided, it is preferable for the guide hole 66 and/or a lateral-face vent 77, described below, to be provided.

As illustrated in FIG. 3, FIG. 10B, FIG. 10C, and (a) in FIG. 11, in a face on a housing-portion 60 side of the first case 6*a*, the shielding-member housing groove 34 is provided on the opposite side, relative to substantially the center in the X direction, of the concave portion 68 in a plan view. The shielding-member housing groove 34 is substantially rectangular in a plan view and is a groove with a flat bottom face. As illustrated in FIG. 5 and FIG. 6, the first shielding member 3*a* rotating causes a portion of the plate-shaped portion 30 to be housed in the shielding-member housing groove 34. In the present embodiment, the Y-direction length of the shielding-member housing groove 34 is longer than the Y-direction length of the first shielding member 3*a*. Thus, the first shielding member 3*a* rotating causes the entirety of the first end side 31*a* of the first face 31 of the plate-shaped portion 30 to be disposed on and touching the bottom face of the shielding-member housing groove 34.

In the present embodiment, as illustrated in FIG. 10B, FIG. 10C, and (a) in FIG. 11, the outer side of an edge portion opposing the shielding-member housing groove 34 in the Y direction is a joining face 70 joined with the second case 6*b*. Thus, by the first shielding member 3*a* rotating in a state in which the first case 6*a* and the second case 6*b* are joined, the interior of the housing portion 60 is more reliably blocked and divided by the first end side 31*a* of the first face 31 of the plate-shaped portion 30, the portion of the second face 32 touching the rotational axis 33, and the lateral faces of the plate-shaped portion 30.

The depth of the shielding-member housing groove 34 is preferably 0.5 to 2 times—more preferably 0.5 to 1 time—the thickness of the fuse element 2. When the depth of the shielding-member housing groove 34 is no less than 0.5 times the thickness of the fuse element 2, the first shielding member 3*a* rotating can more reliably divide the interior of the housing portion 60. Moreover, when the depth of the shielding-member housing groove 34 is no greater than 2 times the thickness of the fuse element 2, a function of the shielding-member housing groove 34 as a stopper provides an appropriate range for the rotational movement of the first shielding member 3*a*. Thus, the small size of the protective element 100 is not compromised by an excessive increase in the size of the concave portion 68 to prevent the first shielding member 3*a* and the concave portion 68 from touching each other due to the rotational movement of the first shielding member 3*a*.

Furthermore, to effectively suppress continuation of the arc discharged when the fuse element 2 is cut, the Z-direction distance between the surface of the fuse element 2 and an inner wall of the housing portion 60 is preferably close. As illustrated in FIG. 4, the Z-direction distance between the surface of the fuse element 2 and the bottom face of the fuse-element mounting face 65 is closer than the Z-direction distance between the surface of the fuse element 2 and the bottom face of the shielding-member housing groove 34. Therefore, it is preferable to shorten the X-direction length of the shielding-member housing groove 34 and increase regions, in the surface of the fuse element 2, opposing the fuse-element mounting face 65.

When the depth of the shielding-member housing groove 34 is no greater than 2 times the thickness of the fuse element 2, even if the X-direction length of the shielding-member housing groove 34 is short, the first end side 31*a* of the first face 31 of the plate-shaped portion 30 can be disposed on and touching the bottom face of the shielding-member housing groove 34 without excessive rotational movement of the first shielding member 3*a*. Therefore, in the surface of the fuse element 2, a ratio of the regions opposing the fuse-element mounting face 65 can be increased, and the arc discharged when the fuse element 2 is cut can be suppressed.

As illustrated in FIG. 10B, FIG. 10C, and (a) in FIG. 11, in the face on the housing-portion 60 side of the first case 6*a*, the fuse-element mounting face 65, which is a concave portion, is provided on the X-direction outer side in a plan view of the shielding-member housing groove 34. A step is formed at a boundary portion between the fuse-element mounting face 65 and the shielding-member housing groove 34 and a boundary portion between the fuse-element mounting face 65 and the joining face 70 joined to the second case 6*b*. In the present embodiment, the depth of the concave portion forming the fuse-element mounting face 65 is preferably no greater than the thickness dimension of the fuse element 2 and can be, for example, a dimension half the thickness of the fuse element 2.

The bottom face of the fuse-element mounting face 65 is disposed close to or touching the fuse element 2 and, as illustrated in FIG. 4, is preferably disposed touching the fuse element 2. When the bottom face of the fuse-element mounting face 65 and the fuse element 2 are disposed so as to be touching each other, the arc discharged when the fuse element 2 fuses becomes even smaller.

In the present embodiment, the Z-direction distance between the bottom face of the fuse-element mounting face 65 of the first case 6*a* (second case 6*b*) and the second shielding member 3*b* (first shielding member 3*a*) disposed opposite thereto via the fuse element 2 is preferably no greater than 10 times—more preferably no greater than 5 times and further preferably no greater than 2 times—the thickness of the fuse element 2. It is particularly preferable for the fuse element 2, the bottom face of the fuse-element mounting face 65 of the first case 6*a* (second case 6*b*), and/or the second shielding member 3*b* (first shielding member 3*a*) to be touching. When the above Z-direction distance is no greater than 10 times the thickness of the fuse element 2, the number of lines of electric force generated by the arc discharge is low, and the arc discharged when the fuse element 2 fuses is small. Moreover, because the above Z-direction distance is short, the protective element 100 can be small in size.

As illustrated in FIG. 10B, FIG. 10C, and (a) in FIG. 11, a leak prevention groove 35 extending in the Y direction is provided in a position on the X-direction outer side in the bottom face of the fuse-element mounting face 65. If, when the fuse element 2 fuses, the melted fuse element 2 is scattered and adhered in the housing portion 60, the leak prevention groove 35 prevents a leak current by dividing an electrical transmission path formed by the adhered material.

The Y-direction length of the leak prevention groove 35 is preferably longer than the Y-direction width 21D of the first end portion 21 of the fuse element 2 and the Y-direction width 22D of the second end portion 22. In this situation, the scattered material adhered in the housing portion 60 when the fuse element 2 fuses forming an electrical connection to the first terminal 61 or second terminal 62 can be effectively prevented, and leak-current generation can be more effectively prevented.

The leak prevention groove 35 is formed at a substantially constant width and depth. The width and depth of the leak prevention groove 35 are not particularly limited; it is sufficient for the leak prevention groove 35 to be able to prevent a leak current by dividing the electrical transmission path formed by the adhered material scattered when the fuse element 2 fuses.

In the protective element 100 of the present embodiment, the leak prevention groove 35 is preferably provided. However, no leak prevention groove 35 needs to be provided. Moreover, the leak prevention groove 35 is preferably provided extending in the Y direction in the position on the X-direction outer side in the bottom face of the fuse-element mounting face 65 but may be in another position on the bottom face of the fuse-element mounting face 65. Alternatively, the leak prevention groove does not need to extend in the Y direction.

As illustrated in FIG. 10A to FIG. 10C and (a) in FIG. 11, lateral-face concave portions 77*a*, each a concave portion, are provided in portions that are edge portions opposing each other in the Y direction of the concave portion 68 and have X-direction positions within the range in which the second bottom face 68*d* is formed. As illustrated in FIG. 10B and FIG. 10C, a step is formed at a boundary portion between the lateral-face concave portion 77*a* disposed in the edge portion of the concave portion 68 and the joining face 70 joined to the second case 6*b*.

As illustrated in FIG. 10A to FIG. 10C and (a) in FIG. 11, in portions that are edge portions opposing each other in the Y direction of the fuse-element mounting face 65 and have X-direction positions more toward the center side than the leak prevention groove 35, lateral-face concave portions 77*a* are provided that are each a flat face continuous from the bottom face of the fuse-element mounting face 65. As illustrated in FIG. 10B and FIG. 10C, a step is formed at a boundary portion between the lateral-face concave portion 77*a* disposed in the edge portion of the fuse-element mounting face 65 and the joining face 70 joined to the second case 6*b*.

By being integrated with the second case 6*b*, each of the four lateral-face concave portions 77*a* provided in the edge portions of the concave portion 68 of the first case 6*a* forms, together with the four lateral-face concave portions 77*a* provided in the second case 6*b*, four lateral-face vents 77 penetrating the case 6 (see FIG. 1). The lateral-face vent 77 suppresses a pressure increase in the housing portion 60 of when the fuse element 2 fuses. This also suppresses arc discharge.

In the present embodiment, the two lateral-face concave portions 77*a* disposed in the edge portions of the concave portion 68 and the two lateral-face concave portions 77*a* disposed in the edge portions of the fuse-element mounting face 65 each have depths of a dimension that is half the thickness of the fuse element 2. Moreover, the two lateral-face concave portions 77*a* disposed in the edge portions of the concave portion 68 and the two lateral-face concave portions 77*a* disposed in the edge portions of the fuse-element mounting face 65 have the same shapes and are disposed symmetrically across the X-direction center of the housing portion 60. Thus, the four lateral-face vents 77 formed by the first case 6*a* and the second case 6*b* being integrated are disposed in positions facilitating the even and rapid exhaustion of the gas in the housing portion 60 generated when the fuse element 2 fuses to outside the housing portion 60. This is preferable.

In the present embodiment, an example is described in which the depth of the lateral-face concave portion 77*a* is the dimension half the thickness of the fuse element 2. However, the depth of the lateral-face concave portion 77*a* is not particularly limited. Moreover, in the present embodiment, an example is described in which the four lateral-face concave portions 77*a* have the same shape. However, a part or all among the four lateral-face concave portions 77*a* may have different shapes.

In the present embodiment, an example is described in which four lateral-face vents 77 are provided. However, the number of lateral-face vents is not particularly limited and may be three or less or may be five or more. Alternatively no lateral-face vent needs to be provided. When no lateral-face vent 77 is provided, it is preferable for the guide hole 66 and/or the bottom-face vent hole 69 to be provided.

As illustrated in FIG. 10B, FIG. 10C, and (a) in FIG. 11, in the face on the housing-portion 60 side of the first case 6*a*, insertion-hole-forming faces 64*a*, each a concave portion, are provided on the X-direction outer side in a plan view of the concave portion 68 and the fuse-element mounting face 65. A step is formed at a boundary portion between each insertion-hole-forming face 64*a* and the joining face 70 joined to the second case 6*b*. The step between the insertion-hole-forming face 64*a* and the joining face 70 has a dimension that, by the first case 6*a* and the second case 6*b* being integrated, enables the formation of an insertion hole 64 that can house a portion in which the first terminal 61 (or second terminal 62) and the fuse element 2 are stacked.

The Y-direction length of the insertion-hole-forming face 64*a* is longer than the Y-direction width 21D of the first end portion 21 of the fuse element 2 and the Y-direction width 22D of the second end portion 22. Thus, the entire face in the direction of the widths 21D, 22D of the first end portion 21 and the second end portion 22 of the fuse element 2 is disposed on the insertion-hole-forming face 64*a*.

As illustrated in FIG. 10B, FIG. 10C, and (a) in FIG. 11, terminal mounting faces 64*b*, each a concave portion, are provided so as to surround, in a plan view, the X-direction outer sides of the two insertion-hole-forming faces 64*a* and a portion of the Y-direction outer sides of the insertion-hole-forming faces 64*a*. The terminal mounting face 64*b* has an external shape corresponding to the flat shape of the first terminal 61 and the second terminal 62. Thus, the first case 6*a* and the first terminal 61 and second terminal 62 can be easily aligned. Moreover, the first terminal 61 and the second terminal 62 are less likely to fall out of the case 6.

For example, in the present embodiment, the terminal mounting face 64*b* preferably has an external shape corresponding to the substantially T-shaped flat shape of the first terminal 61 having the flange portion 61*c* and the second terminal 62 having the flange portion 62*c*. The present configuration provides a protective element 100 in which the flange portion 61*c* and the flange portion 62*c* are less likely to fall out and reliability and durability are favorable.

As illustrated in FIG. 10B and FIG. 10C, the terminal mounting face 64*b* is provided in a position closer to the joining face 70, joined to the second case 6*b*, in the Z direction than the surface of the insertion-hole-forming face 64*a*. Thus, a step is formed at a boundary portion between the terminal mounting face 64*b* and the insertion-hole-forming face 64*a*. A step is also formed at a boundary portion between the terminal mounting face 64*b* and the joining face 70 joined to the second case 6*b*. The step between the terminal mounting face 64*b* and the joining face 70 has a dimension that, by the first case 6*a* and the second case 6*b* being integrated, enables the first terminal 61 (or second terminal 62) to be housed.

As illustrated in FIG. 10B, FIG. 10C, and (a) in FIG. 11, cutouts 78*a*, each a concave portion having a substantially semicircular bottom face, are formed in Y-direction center portions of edge portions on the X-direction outer sides of the two terminal mounting faces 64*b*. The cutouts 78*a*, by the first case 6*a* and the second case 6*b* being integrated, become a first adhesive inlet 78 having a shape that is substantially a circular pillar when viewed from the X direction (see FIG. 1 and FIG. 3).

As illustrated in FIG. 10A to FIG. 10C and (a) to (d) in FIG. 11, in the joining face 70 joined to the second case 6*b* of the first case 6*a*, cutouts 76*a* are respectively formed in positions of the four corners, in a plan view, of the first case 6*a*. The cutouts 76*a*, by the first case 6*a* and the second case 6*b* being integrated, become a hollow second adhesive inlet 76 having a pillar shape that is semicircular in a sectional view when viewed from the X direction (see FIG. 1).

As illustrated in FIG. 10B and FIG. 10C, mating concave portions 63, each substantially circular in a plan view, are formed between the two cutouts 76*a* formed on the concave-portion 68 side, among the four cutouts 76*a* formed in the joining face 70 joined to the second case 6*b* of the first case 6*a*, and the terminal mounting face 64*b*.

Moreover, as illustrated in FIG. 10B, FIG. 10C, and (a) in FIG. 11, mating convex portions 67, each substantially circular in a plan view, are formed between the two cutouts 76*a* formed on the fuse-element-mounting-face 65 side, among the four cutouts 76*a* formed in the joining face 70 joined to the second case 6*b* of the first case 6*a*, and the terminal mounting face 64*b*. The mating concave portions 63 are mated to the mating convex portions 67 by the first case 6*a* and the second case 6*b* being integrated.

As illustrated in FIG. 10A and (b) and (e) in FIG. 11, a first buffering concave portion 73 formed in a face on the opposite side of the joining face 70 joined to the second case 6*b* is provided in the outer face of the first case 6*a*. Moreover, as illustrated in FIG. 10A to FIG. 10C and (a) in FIG. 11, second concave portions 74 are respectively provided in both Y-direction lateral faces of the first case 6*a*. The second concave portions 74 become a second buffering concave portion 75 (see FIG. 1) by the first case 6*a* and the second case 6*b* being integrated. Moreover, as illustrated in FIG. 10A to FIG. 10C and (b) to (e) in FIG. 11, end members 72 having a semicircular-pillar outer shape are respectively provided in both X-direction end portions of the outer face of the first case 6*a*. The end members 72 form a circular pillar shape by the first case 6*a* and the second case 6*b* being integrated.

The first buffering concave portion 73 and the second concave portion 74 (second buffering concave portion 75) form the internal-pressure buffer space 71 surrounded by the outer face of the case 6, made by the first case 6*a* and the second case 6*b* being integrated, and the inner face of the cover 4. The internal-pressure buffer space 71 is provided in a ring shape in an X-direction center portion of the cover 4, along the inner face of the cover 4.

In the present embodiment, a sufficient X-direction length (thickness) of the end member 72 is ensured so stress due to a pressure increase in the internal-pressure buffer space 71 when the fuse element 2 fuses can be withstood. Specifically, the X-direction length of the end member 72 is, for example, preferably 1 to 3 times the thickness of the cover 4.

As illustrated in (a) and (b) in FIG. 11, the guide hole 66 and the two bottom-face vent holes 69 that penetrate the first case 6*a* and communicate the housing portion 60 and the internal-pressure buffer space 71 are opened in the first buffering concave portion 73. Moreover, as illustrated in FIG. 1, the two lateral-face vents 77 that are formed by the lateral-face concave portions 77*a* provided in the first case 6*a* and the lateral-face concave portions 77*a* provided in the second case 6*b* being integrated, penetrate the case 6, and communicate the housing portion 60 and the internal-pressure buffer space 71 are respectively opened in the two second buffering concave portions 75 made by integrating the first case 6*a* and the second case 6*b*.

The gas in the housing portion 60 generated when the fuse element 2 fuses flows into the internal-pressure buffer space 71 from within the housing portion 60 via the lateral-face vents 77, the guide hole 66, and the bottom-face vent holes 69. Thus, a pressure increase in the housing portion 60 when the fuse element 2 fuses is suppressed, and arc discharge is suppressed. In order to be able to effectively suppress a pressure increase in the housing portion 60, the volume of the internal-pressure buffer space 71 is preferably no less than the volume of the fuse element 2, more preferably no less than 100 times the volume of the fuse element 2, and further preferably no less than 1,000 times the volume of the fuse element 2.

The first case 6*a* and the second case 6*b* are made of an insulating material. As the insulating material, one similar to the material that can be used for the first shielding member 3*a* and the second shielding member 3*b* can be used. The first case 6*a* and second case 6*b* and the first shielding member 3*a* and second shielding member 3*b* may be made of the same material or different materials.

The first case 6*a* and the second case 6*b* can be produced by a known method.

(Cover)

As illustrated in FIG. 1, the cover 4 covers the lateral face along the X direction of the case 6 and fixes the first case 6*a* and the second case 6*b*. As illustrated in FIG. 1 and FIG. 3, the cover 4 exposes a portion of the first terminal 61 from a first end 41 and exposes a portion of the second terminal 62 from a second end 42.

As illustrated in FIG. 2, the cover 4 has a cylindrical shape of a substantially uniform thickness and, as illustrated in FIG. 3, has an inner diameter corresponding to the shape that is substantially a circular pillar into which the end member 72 of the first case 6*a* and the end member 72 of the second case 6*b* are integrated. As illustrated in FIG. 2 and FIG. 3, an edge portion on the inner side in an opening portion of the cover 4 is an inclined face 4*a* that is chamfered.

In the present embodiment, a space region that is the housing portion 60 and the internal-pressure buffer space 71 is sealed by the outer face of the case 6 and the inner face of the cover 4.

In the present embodiment, the cover 4 is cylindrical. Thus, a pressure on the cover 4 when the fuse element 2 fuses is dispersed and loaded substantially evenly over the entire inner face of the cover 4 via the internal-pressure buffer space 71, provided in the ring shape along the inner face of the cover 4 in the X-direction center portion of the cover 4, and via the end member 72, housed along the inner face of the cover 4 in an X-direction edge portion of the cover 4. As a result, the cover 4 exhibits excellent strength and effectively prevents the protective element 100 from being destroyed when the fuse element 2 fuses. Moreover, because the cover 4 is cylindrical, it is easily produced, providing excellent productivity.

The cover 4 is made of an insulating material. As the insulating material, one similar to the material that can be used for the first shielding member 3*a* and second shielding member 3*b* and the first case 6*a* and second case 6*b* can be used. The cover 4, the first case 6*a* and second case 6*b*, and the first shielding member 3*a* and second shielding member 3*b* may all be made of different materials, or a portion or the entirety may be made from the same material.

The cover 4 can be produced by a known method.

(Method of Producing Protective Element)

Next, a method of producing the protective element 100 of the present embodiment is described.

To produce the protective element 100 of the present embodiment, first, the fuse element 2 and the first terminal 61 and second terminal 62 are prepared. Then, as illustrated in FIG. 7, the first terminal 61 is soldered and connected onto the first end portion 21 of the fuse element 2. Moreover, the second terminal 62 is soldered and connected onto the second end portion 22.

As the solder material used for soldering in the present embodiment, a known material can be used. From viewpoints of resistivity, melting point, and using a lead-free material to reduce environmental impact, a material whose main component is Sn is preferably used.

The first end portion 21 and second end portion 22 of the fuse element 2 and the first terminal 61 and second terminal 62 may be connected by being joined by welding. A known joining method can be used.

Next, the first shielding member 3*a* and second shielding member 3*b* illustrated in FIG. 8A to FIG. 8B and FIG. 9 and the first case 6*a* and second case 6*b* illustrated in FIG. 10A to FIG. 10C and FIG. 11 are prepared.

Figure 12A:
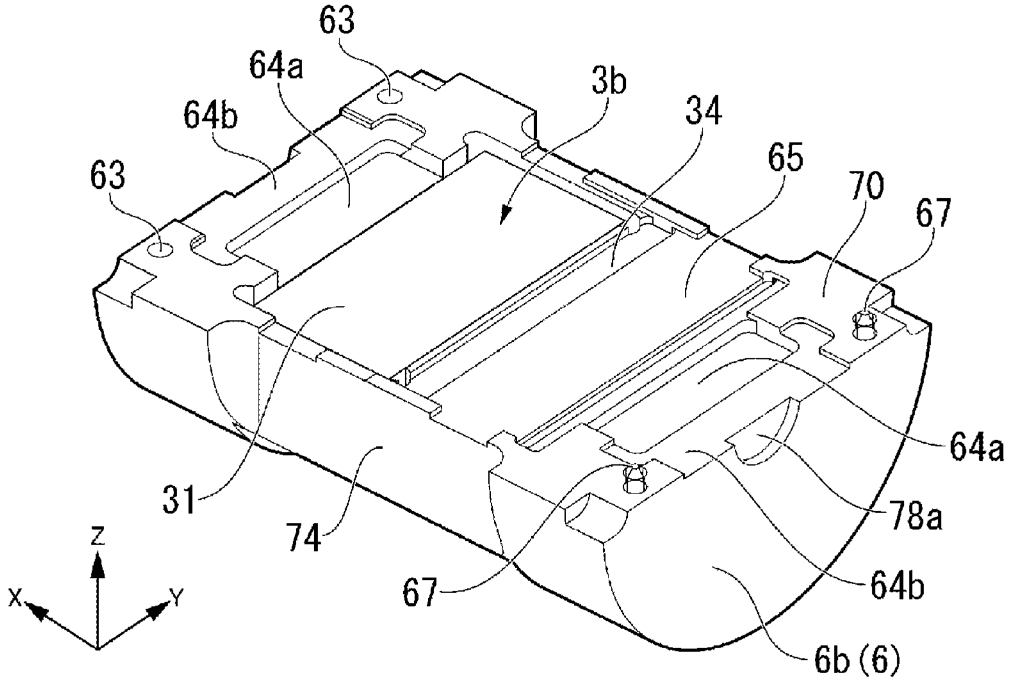
FIG. 12A is a diagram for describing steps for producing the protective element 100 of the first embodiment and is a perspective view viewing a second case 6*b*, in which a second shielding member 3*b* is disposed, from the housing-portion 60 side.

The first shielding member 3*a* is then disposed in the concave portion 68 of the first case 6*a*. At this time, as illustrated in FIG. 4, the second face 32 of the plate-shaped portion 30 of the first shielding member 3*a* is disposed touching the step (rotational axis 33) formed in the concave portion 68 of the first case 6*a*. Moreover, the second shielding member 3*b* is disposed in the concave portion 68 of the second case 6*b*. At this time, as illustrated in FIG. 4, the second face 32 of the plate-shaped portion 30 of the second shielding member 3*b* is disposed touching the step (rotational axis 33) formed in the concave portion 68 of the second case 6*b*. FIG. 12A is a perspective view viewing the second case 6*b*, in which the second shielding member 3*b* is disposed, from the housing-portion 60 side.

Figure 12B:
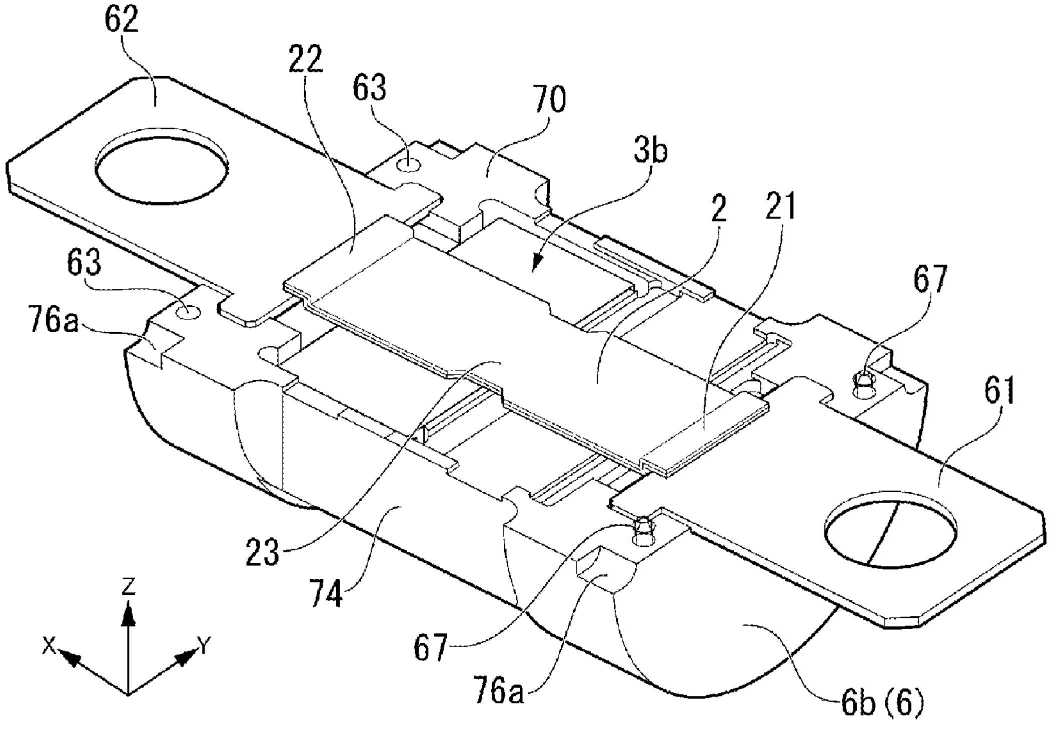
FIG. 12B is a diagram for describing the steps for producing the protective element 100 of the first embodiment and is a perspective view illustrating the fuse element 2, integrated with the first terminal 61 and the second terminal 62, disposed on the second case 6*b* in which the second shielding member 3*b* is disposed.

Next, as illustrated in FIG. 12B, on the second case 6*b* in which the second shielding member 3*b* is disposed, a member in which the fuse element 2 and the first terminal 61 and second terminal 62 are integrated is disposed. In the present embodiment, respectively mounting the first terminal 61 and the second terminal 62 on the two terminal mounting faces 64*b* aligns the fuse element 2, the first terminal 61, and the second terminal 62 with the second case 6*b*.

In the present embodiment, as illustrated in FIG. 12B, an example is described in which faces on a first-terminal 61 and second-terminal 62 side in the portion in which the first terminal 61 and second terminal 62 and the first end portion 21 and second end portion 22 of the fuse element 2 are connected are disposed facing the second case 6*b*. However, a face on a fuse-element 2 side may be disposed facing the second case 6*b*.

Figure 13A:
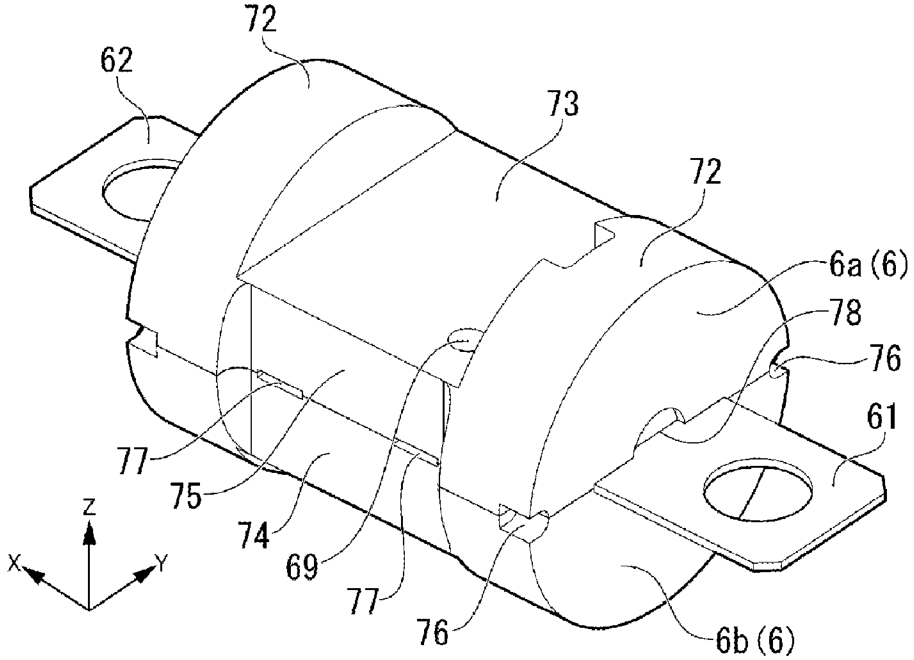
FIG. 13A is a diagram for describing the steps for producing the protective element 100 of the first embodiment and is a perspective view illustrating the first case 6*a* disposed on the second case 6*b* via the fuse element 2.

Next, the first case 6*a* in which the first shielding member 3*a* is disposed is disposed on the second case 6*b* in which the member in which the fuse element 2 and the first terminal 61 and second terminal 62 are integrated and the second shielding member 3*b* are disposed. At this time, the mating concave portions 63 provided by the first case 6*a* and the mating convex portions 67 provided by the second case 6*b* are mated, and the mating convex portions 67 provided by the first case 6*a* and the mating concave portions 63 provided by the second case 6*b* are mated. Thus, the first case 6*a* and the second case 6*b* are aligned. FIG. 13A is a perspective view illustrating a state in which the first case 6*a* is disposed on the second case 6*b* via the fuse element 2.

As illustrated in FIG. 13A, the first case 6*a* being disposed on the second case 6*b* forms the second buffering concave portions 75, the lateral-face vents 77, the first adhesive inlets 78, and the second adhesive inlets 76. Moreover, as illustrated in FIG. 3, the first end portion 21 of the fuse element 2 is housed in one insertion hole 64, the second end portion 22 of the fuse element 2 is housed in the other insertion hole 64, and a portion of the first terminal 61 and a portion of second terminal 62 connected to the fuse element 2 are exposed outside the case 6.

Figure 13B:
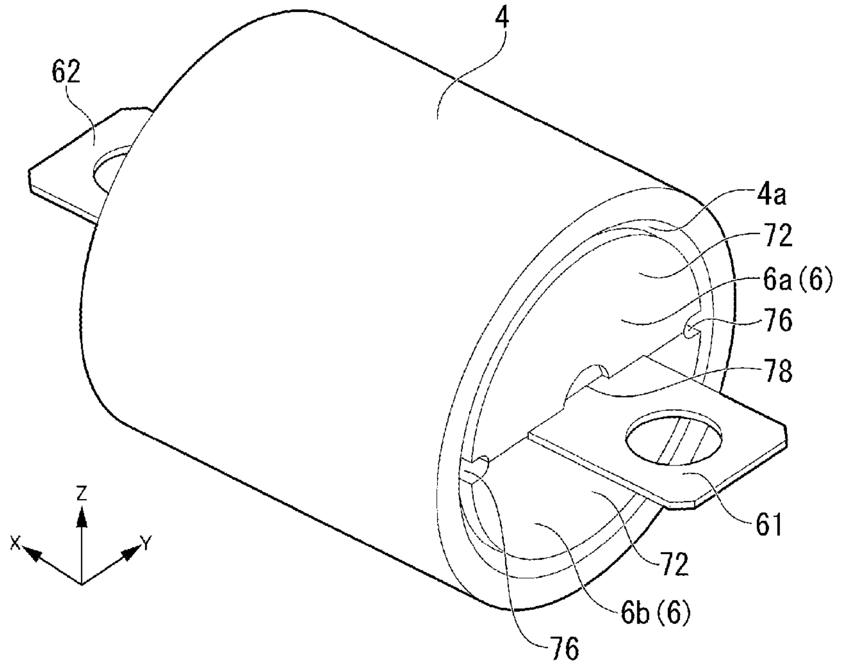
FIG. 13B is a diagram for describing the steps for producing the protective element 100 of the present embodiment and is a perspective view illustrating the first case 6*a* and the second case 6*b* integrated and housed in a cover 4.

Next, as illustrated in FIG. 13B, in the state in which the first case 6*a* and the second case 6*b* are integrated, the assembly is housed in the cover 4. Thus, the end members 72 forming the lateral face along the X direction of the case 6, the first buffering concave portions 73, and the second buffering concave portions 75 are covered by the cover 4, and the first case 6*a* and the second case 6*b* are fixed.

Afterward, an adhesive is respectively injected into the inclined face 4*a* of the cover 4, the first adhesive inlets 78, and the second adhesive inlets 76. As the adhesive, for example, an adhesive containing a thermosetting resin can be used. Thus, the interior of the cover 4 is sealed and, as illustrated in FIG. 1 and FIG. 3, the space region that is the housing portion 60 and the internal-pressure buffer space 71 is sealed by the outer face of the case 6 and the inner face of the cover 4.

The protective element 100 of the present embodiment is obtained by the above steps.

(Operations of Protective Element)

Next, operations of the protective element 100 when a current exceeding the rated current flows through the fuse element 2 of the protective element 100 of the present embodiment are described.

When a current exceeding the rated current flows through the fuse element 2 of the protective element 100 of the present embodiment, the fuse element 2 increases in temperature due to heat generation from the overcurrent. Then, when the cutting portion 23 of the fuse element 2 melts due to the temperature increase, the fuse element fuses or is cut. At this time, a spark occurs between the cut faces or fused faces of the cutting portion 23, and an arc is discharged.

In the protective element 100 of the present embodiment, among the areas of the plate-shaped portion 30, as viewed from the fuse element 2, of the first shielding member 3*a* and the second shielding member 3*b*, the first area 30*a*, which is disposed toward the first end side 31*a* close to the rotational axis 33, is smaller than the second area 30*b*, which is disposed toward the second end side 31*b* far from the rotational axis 33. Thus, when the first face 31 of the plate-shaped portion 30 provided by the first shielding member 3*a* and the second shielding member 3*b* is pressed by the pressure increase in the housing portion 60 due to the arc discharged when the fuse element 2 fuses, as illustrated in FIG. 5 and FIG. 6, the first shielding member 3*a* rotates around the rotational axis 33, and the second shielding member 3*b* rotates around the rotational axis 33.

In the present embodiment, as illustrated in FIG. 6, the first shielding member 3*a* and the second shielding member 3*b* rotate in the direction in which the second-end-side 31*b* side, disposed on the X-direction outer side of the housing portion 60, separates from the fuse element 2 and the first-end-side 31*a* side, disposed on the X-direction inner side of the housing portion 60, approaches the fuse element 2. The first end side 31*a* is then pressed onto the bottom face of the shielding-member housing groove 34 provided in the inner face of the housing portion 60. Moreover, the second end side 31*b* is housed in the concave portion 68.

As described above, the protective element 100 of the present embodiment has: the fuse element 2 energized in the X direction from the first end portion 21 to the second end portion 22; the first terminal 61 electrically connected to the first end portion 21; the second terminal 62 electrically connected to the second end portion 22; the case 6 that is made of an insulating material, has provided therein the housing portion 60 that stores the fuse element 2, and exposes to the outside a portion of the first terminal 61 and a portion of the second terminal 62; and the cover that is made of an insulating material in a tube shape, covers the lateral face along the X direction of the case 6, exposes a portion of the first terminal 61 from the first end 41, and exposes a portion of the second terminal 62 from the second end 42.

Therefore, in the protective element 100 of the present embodiment, the stress due to the pressure increase in the case 6 when the fuse element 2 fuses is loaded onto the case 6 and the cover 4 covering the lateral face along the X direction of the case 6. Thus, compared to when, for example, no cover 4 is provided, excellent strength is provided against the pressure increase in the case 6. Thus, the protective element 100 of the present embodiment is less likely to be destroyed when the fuse element 2 fuses and has excellent safety.

Furthermore, in the protective element 100 of the present embodiment, the case 6 is made of the first case 6*a* and the second case 6*b*, which is disposed opposing the first case 6*a* and the fuse element 2. The first case 6*a* and the second case 6*b* interpose a portion of the first terminal 61 and a portion of the second terminal 62, and are fixed by the cover 4. Thus, the pressure due to the gas generated in the housing portion 60 when the fuse element 2 fuses is dispersed and loaded substantially evenly across the first case 6*a* and the second case 6*b*. Moreover, because the first case 6*a* and the second case 6*b* are fixed by the cover 4, separation between the first case 6*a* and the second case 6*b* due to the pressure increase in the housing portion 60 is prevented. Moreover, the cover 4 reinforces the lateral face along the X direction of the case 6. Accordingly, the protective element 100 is less likely to be destroyed when the fuse element 2 fuses.

Furthermore, in the protective element 100 of the present embodiment, the internal-pressure buffer space 71 surrounded by the outer face of the case 6 and the inner face of the cover 4 is provided, the case 6 has the lateral-face vents 77 and the bottom-face vent holes 69 that are vent holes that penetrate the case 6 and communicate the housing portion 60 and the internal-pressure buffer space 71, and the space region that is the housing portion 60 and the internal-pressure buffer space 71 is sealed by the outer face of the case 6 and the outer face of the cover 4. Therefore, the gas generated in the housing portion 60 of the case 6 when the fuse element 2 fuses flows into the internal-pressure buffer space 71 via the lateral-face vents 77, the guide holes 66, and the bottom-face vent holes 69. As a result, the pressure increase in the housing portion 60 is suppressed. In fact, in the internal-pressure buffer space 71, pressure in a direction orthogonal to the X direction is mainly loaded on the cover 4, and pressure in a direction along the X direction is mainly loaded on the end members 72 of the case 6. Accordingly, the stress due to the pressure increase in the case 6 when the fuse element 2 fuses is dispersed and loaded at appropriate ratios onto the case 6 and the cover 4, and more excellent strength is obtained against the pressure increase in the case 6. Thus, the protective element 100 is less likely to be destroyed when the fuse element 2 fuses. Moreover, in such a protective element 100, because the space region is sealed, the melted and scattered fuse element 2 can be prevented from being scattered outside the space region.

Furthermore, the protective element 100 of the present embodiment is provided with: the first shielding member 3*a* and the second shielding member 3*b*, made of an insulating material, in which the plate-shaped portion 30—in which the first face 31 is disposed opposing the fuse element 2 and the second face 32 is disposed touching the rotational axis 33 extending in the Y direction—is provided and the area of the plate-shaped portion 30 as viewed from the fuse element 2 differs between the first area 30*a* and the second area 30*b* divided by the position 33*a* whereat the plate-shaped portion 30 and the rotational axis 33 touch; and the case 6, which is made of an insulating material and has provided therein the housing portion 60 storing the fuse element 2, the first shielding member 3*a*, and the second shielding member 3*b*.

Furthermore, in the protective element 100 of the present embodiment, the pressure increase in the housing portion 60 due to the arc discharged when the fuse element 2 fuses presses the first face 31 of the first shielding member 3*a* and the second shielding member 3*b*. Thus, as illustrated in FIG. 5 and FIG. 6, the first shielding member 3*a* and the second shielding member 3*b* respectively rotate around the rotational axis 33. As a result, the interior of the housing portion 60 is blocked and divided in two locations in the X direction by the first shielding member 3*a* and the second shielding member 3*b*.

At this time, in the present embodiment, a space interposed by the first shielding member 3*a* and the second shielding member 3*b* is formed. This space is surrounded by the bottom face of the shielding-member housing groove 34, the concave portion 68, the first end side 31*a* of the first face 31 of the plate-shaped portion 30 respectively provided by the first shielding member 3*a* and the second shielding member 3*b*, the portion of the second face 32 touching the rotational axis 33, and the lateral faces of the plate-shaped portion 30.

Therefore, in the present embodiment, the interior of the housing portion 60 being divided by the first shielding member 3*a* and the second shielding member 3*b* insulates the fused faces or cut faces of the cut or fused fuse element 2 from each other. Moreover, the two insertion holes 64 opening into the housing portion 60 are separated, and the current path is cut off. As a result, the arc discharged when the fuse element 2 fuses is suppressed (extinguished) rapidly.

That is, in the protective element 100 of the present embodiment, the arc discharged when the fuse element 2 fuses is small. Therefore, in the protective element 100 of the present embodiment, the housing portion 60 being destroyed by the pressure increase in the housing portion 60 can be prevented, and excellent safety is provided.

The protective element 100 of the present embodiment can be preferably disposed in a current path of, for example, a high voltage of 100 V or higher and a large current of 100 A or more. It can also be disposed in a current path of a high voltage of 400 V or higher and a large current of 120 A or more.

In the protective element 100 of the present embodiment, more preferably, the fuse element 2 is the stacked body in which the inner layer, which is Sn or the metal whose main component is Sn, and the outer layer, which is Ag or Cu or the metal whose main component is Ag or Cu, are stacked in the thickness direction and the shielding member 3, the case 6, and the cover 4 are formed of a resin material. In such a protective element, due to the reasons given below, the arc discharged when the fuse element 2 fuses is even smaller, and a smaller size can be provided for the protective element.

That is, when the fuse element 2 is the above stacked body, the fusing temperature of the fuse element 2 is low, at, for example, 300 to 400° C. Therefore, sufficient heat resistance is obtained even if the shielding member 3, the case 6, and the cover 4 are the resin material. Moreover, since the fusing temperature of the fuse element 2 is low, even if the shielding member 3 and/or the inner face of the housing portion 60 and the cutting portion 23 of the fuse element 2 are disposed touching each other, the fuse element 2 reaches the fusing temperature in a short time. Therefore, the Z-direction distance between the shielding member 3 and/or the inner face of the housing portion 60 and the fuse element 2 can be sufficiently shortened without compromising the function of the fuse element 2.

In fact, in such a protective element, the heat accompanying the fusing of the fuse element 2 decomposes the resin material forming the shielding member 3, the case 6, and the cover 4, generating a thermal decomposition gas. This heat of vaporization cools the interior of the housing portion 60 (resin ablation effect). As a result, the arc discharge becomes even smaller. Accordingly, in a protective element in which the fuse element 2 is the above stacked body and the shielding member 3, the case 6, and the cover 4 are formed of the resin material, the Z-direction distance between the shielding member 3 and/or the inner face of the housing portion 60 and the fuse element 2 can be shortened to make the arc discharge even smaller, and the protective element can be further reduced in size.

As a resin material wherewith the ablation effect due to the heat accompanying the fusing of the fuse element 2 is easily obtained, nylon 46, nylon 66, polyacetal (POM), polyethylene terephthalate (PET), and the like can be mentioned. As the resin material forming the shielding member 3, the case 6, and the cover 4, from viewpoints of heat resistance and flame resistance, nylon 46 or nylon 66 is preferably used.

The ablation effect by the resin is more effectively obtained when the Y-direction distances of the concave portion 68, the shielding-member housing groove 34, and the fuse-element mounting face 65 forming the inner face of the housing portion 60 and the Y-direction distance of the first face 31 of the shielding member 3 are no less than 1.5 times the Y-direction length of the fuse element 2 (widths 21D, 22D). This can be assumed to be because even when the shielding member 3 and/or the inner face of the housing portion 60 and the cutting portion 23 of the fuse element 2 are disposed touching each other, the surface area of the shielding member 3 and/or the surface area in the housing portion 60 is sufficiently large and decomposition of the resin material due to the heat accompanying the fusing of the fuse element 2 is promoted.

In contrast, in a protective element in which the fuse element is made of Cu and the case is made of a ceramic material, providing a small size may be difficult due to the following reasons.

That is, when the fuse element is made of Cu, the fusing temperature of the fuse element is high, at 1,000° C. or higher. Thus, when a resin material is used as the material of the case, the heat resistance of the case may be insufficient. Therefore, as the material of the case, a ceramic material that is a material with excellent heat resistance is used.

In this protective element, because the fusing temperature of the fuse element is high and a ceramic material is used as the material of the case, a close distance between the cutting portion of the fuse element and the inner face of the case causes the heat generated in the cutting portion to be released via the case, making the fuse element less likely to reach the fusing temperature. Thus, a sufficient distance must be ensured between the cutting portion and the inner face of the case. Thus, in a protective element in which the fuse element is made of Cu and the case is made of a ceramic material, a large housing portion must be provided in the case.

In fact, when a sufficient distance is ensured between the cutting portion and the inner face of the case, the number of lines of electric force generated by the arc discharge is high, increasing the scope of the arc discharged when the fuse element fuses. Thus, to rapidly suppress (extinguish) the arc discharge, an arc-extinguishing material may need to be placed in the housing portion in the case. When placing an arc-extinguishing material in the case, a space for housing the arc-extinguishing material must be secured in the case. Thus, an even larger housing portion must be provided in the case, which may make it even more difficult to provide a small size.

Other Embodiments

The protective element of the present invention is not limited to the protective element 100 of the first embodiment above.

For example, in the protective element 100 of the first embodiment above, an example is described in which the cutting portion 23 is disposed near the X-direction center of the fuse element 2, the first shielding member 3*a* and the second shielding member 3*b* have the same shape, and the first case 6*a* and the second case 6*b* have the same shape. However, the position of the cutting portion does not need to be near the X-direction center of the fuse element. In this situation, the first shielding member 3*a* and the second shielding member 3*b* have different X-direction lengths. Moreover, the first case 6*a* has a housing-portion shape corresponding to the shape of the first shielding member 3*a*, and the second case 6*b* has a housing-portion shape corresponding to the shape of the second shielding member 3*b*.

In the first embodiment above, the protective element 100 having the shielding member 3 is described as an example. However, the shielding member 3 is disposed in the housing portion 60 as necessary to rapidly suppress (extinguish) the arc discharged when the fuse element 2 fuses and does not need to be disposed. When the protective element has no shielding member, there is no need to provide the shielding-member housing groove in the housing portion. Thus, for example, instead of the shielding-member housing groove, the bottom face of the fuse-element mounting face can be disposed extended to the region in which the shielding-member housing groove would have been disposed. Moreover, when the protective element has no shielding member, no guide hole is necessary. Moreover, to rapidly suppress (extinguish) the arc discharged when the fuse element fuses, instead of the concave portion in the housing portion, a fuse-element mounting face may be provided. In this situation, it is preferable to provide one or two or more bottom-face vent holes in a bottom face of the fuse-element mounting face.

In the first embodiment above, an example is described in which the cover 4 has a cylindrical shape. However, it is sufficient for the shape of the cover to be pillar-shaped. The shape may be, for example, an oval cylinder, an elliptic cylinder, or a polygonal tube and is not limited to being cylindrical. When the cover is not cylindrical, the sectional shape of the end members provided by the first case and the second case preferably has a shape corresponding to the sectional shape of the cover. This is to enable easy sealing of the interior of the cover.

In the first embodiment 100 above, as necessary, pressing means such as a spring may be provided that imparts a force, in the rotational direction of the shielding member, to the second face of the plate-shaped portion. In such a protective element, the arc discharged when the fuse element fuses is more rapidly suppressed (extinguished). Thus, a protective element is provided that is less likely to be destroyed when the fuse element fuses and has more excellent safety.

REFERENCE SIGNS LIST

2 Fuse element; 3 Shielding member; 3*a* First shielding member; 3*b* Second shielding member; 4 Cover; 41 First end; 42 Second end; 6 Case; 6*a* First case; 6*b* Second case; 21 First end portion; 22 Second end portion; 23 Cutting portion (constricted portion); 24*a* First bent portion; 24*b* Second bent portion; 25 First linking portion; 26 Second linking portion; 30 Plate-shaped portion; 33*a* Touching position; 30*a* First area; 30*b* Second area; 31 First face; 31*a*, 32*a* First end side; 31*b* Second end side; 32 Second face; 32*b* Second end face; 33 Rotational axis; 34 Shielding-member housing groove; 35 Leak prevention groove; 38 Convex portion; 60 Housing portion; 61 First terminal; 61*a*, 62*a* External terminal hole; 61*c*, 62*c* Flange portion; 62 Second terminal; 63 Mating concave portion; 64 Insertion hole; 64*a* Insertion-hole-forming face; 64*b* Terminal mounting face; 65 Fuse-element mounting face; 66 Guide hole; 67 Mating convex portion; 68 Concave portion; 68*a* First wall face; 68*b* Second wall face; 68*c* First bottom face; 68*d* Second bottom face; 69 Bottom-face vent hole; 70 Joining face; 71 Internal-pressure buffer space; 72 End member; 73 First buffering concave portion; 74 Second concave portion; 75 Second buffering concave portion; 76 Second adhesive inlet; 76*a* Cutout; 77 Lateral-face vent; 77*a* Lateral-face concave portion; 78 First adhesive inlet; 78*a* Cutout; 100 Protective element

The invention claimed is:

1. A protective element, comprising:

a fuse element configured to be energized in a first direction, which is a direction from a first end portion of the fuse element to a second end portion of the fuse element;

a first terminal electrically connected to the first end portion;

a second terminal electrically connected to the second end portion;

a case made of an insulating material, having therein a housing portion storing the fuse element, and exposing a portion of the first terminal and a portion of the second terminal to an outside of the case; and a cover made of an insulating material having a tube shape, covering a lateral face along the first direction of the case, and exposing a portion of the first terminal from a first end of the cover, and exposes a portion of the second terminal from a second end of the cover, wherein the case has a buffer recess on the outer face thereof, the protective element is provided with an internal-pressure buffer space surrounded by the buffer recess on the outer face of the case and an inner face of the cover, the case has a vent hole that penetrates the case and communicates the housing portion and the internal-pressure buffer space, and the outer face of the case and the inner face of the cover seal a space region that is the housing portion and the internal-pressure buffer space.

2. The protective element of claim 1, wherein the case comprises: a first case; and a second case disposed opposing the first case with respect to the fuse element, and the first case and the second case interpose a portion of the first terminal and a portion of the second terminal, and are fixed by the cover.

3. The protective element of claim 1, wherein at least one of the case and the cover is made of a resin material which is a nylon resin, a fluororesin, or a polyphthalamide resin.

4. The protective element of claim 3, wherein the resin material has a tracking resistance index CTI of 600 V or higher.

5. The protective element of claim 3, wherein the nylon resin comprises no benzene ring.

6. The protective element of claim 1, wherein the fuse element is a stacked body in which an inner layer that comprises a low-melting-point metal and an outer layer that comprises a high-melting-point metal are stacked in a thickness direction of the stacked body.

7. The protective element of claim 6, wherein the low-melting-point metal is Sn or a metal comprising Sn as a main component thereof, and the high-melting-point metal is Ag, Cu, or a metal comprising Ag or Cu as a main component thereof.

8. The protective element of claim 1, wherein the buffer recess is provided at a center portion of the case in the first direction.

9. The protective element of claim 8, wherein the case comprises end members provided at end portions of the case in the first direction, and the buffer recess is provided between the end members.

10. The protective element of claim 9, wherein the end members each have a circular-pillar outer shape which can be inserted into the cover having the tube shape.

* * * * *